(12) United States Patent  
Elhoushi et al.

(10) Patent No.: US 12,487,091 B2  
(45) Date of Patent: Dec. 2, 2025

(54) METHOD AND SYSTEM FOR FINGERPRINTING SURVEY

(71) Applicant: InvenSense, Inc., San Jose, CA (US)

(72) Inventors: Mostafa Elhoushi, Calgary (CA); Amr Al-Hamad, Calgary (CA); Abdelrahman Ali, Calgary (CA); Jacques Georgy, Calgary (CA); Chris Goodall, Calgary (CA); Anas Mahmoud, Calgary (CA)

( * ) Notice: Subject to any disclaimer, the term of this patent is extended or adjusted under 35 U.S.C. 154(b) by 17 days.

(21) Appl. No.: 16/118,970

(22) Filed: Aug. 31, 2018

(65) Prior Publication Data

US 2019/0170521 A1    Jun. 6, 2019

Related U.S. Application Data

(60) Provisional application No. 62/594,640, filed on Dec. 5, 2017.

(51) Int. Cl.
| | | |
|---|---|---|
| *G01C 21/34* | (2006.01) | |
| *G01C 21/20* | (2006.01) | |
| *G01C 21/36* | (2006.01) | |
| *G05D 1/00* | (2024.01) | |

(52) U.S. Cl.  
CPC .......... *G01C 21/343* (2013.01); *G01C 21/20* (2013.01); *G01C 21/34* (2013.01); *G01C 21/3446* (2013.01); *G01C 21/3641* (2013.01); *G05D 1/02* (2013.01)

(58) Field of Classification Search  
CPC ...... G01C 21/343; G01C 21/20; G01C 21/34; G01C 21/3446; G01C 21/3641; G05D 1/02  
See application file for complete search history.

(56) References Cited

U.S. PATENT DOCUMENTS

| | | | | |
|---|---|---|---|---|
| 9,140,555 | B1 * | 9/2015 | Andersson | G01C 21/206 |
| 9,459,745 | B2 * | 10/2016 | Tseng | G06F 3/0443 |
| 2018/0328745 | A1 * | 11/2018 | Nagy | G05D 1/0219 |

OTHER PUBLICATIONS https://web.archive.org/web/20171126042117/https://en.wikipedia.org/wiki/K-means_clustering (Year: 2017).*

* cited by examiner

*Primary Examiner* — Aaron L Troost

(57) ABSTRACT

A survey for building fingerprint maps for an area may be achieved using map information to generate a grid of nodes and links, then transforming the grid to a directed graph, generating an improved tour that entirely traverses the directed graph and providing at least one survey route based at least in part on the tour to a surveyor that will perform the survey route. The provided survey route may be traversed with at least one device having an integrated sensor assembly that outputs data representing motion of the device and recording signal measurements with each device at a plurality of positions to generate a fingerprint map. The traversal of the provided survey route may be assessed through in-route assessment and/or post-route assessment. Depending on the assessment, the provided survey route may be re-traversed or a next survey route may be scheduled.

52 Claims, 35 Drawing Sheets

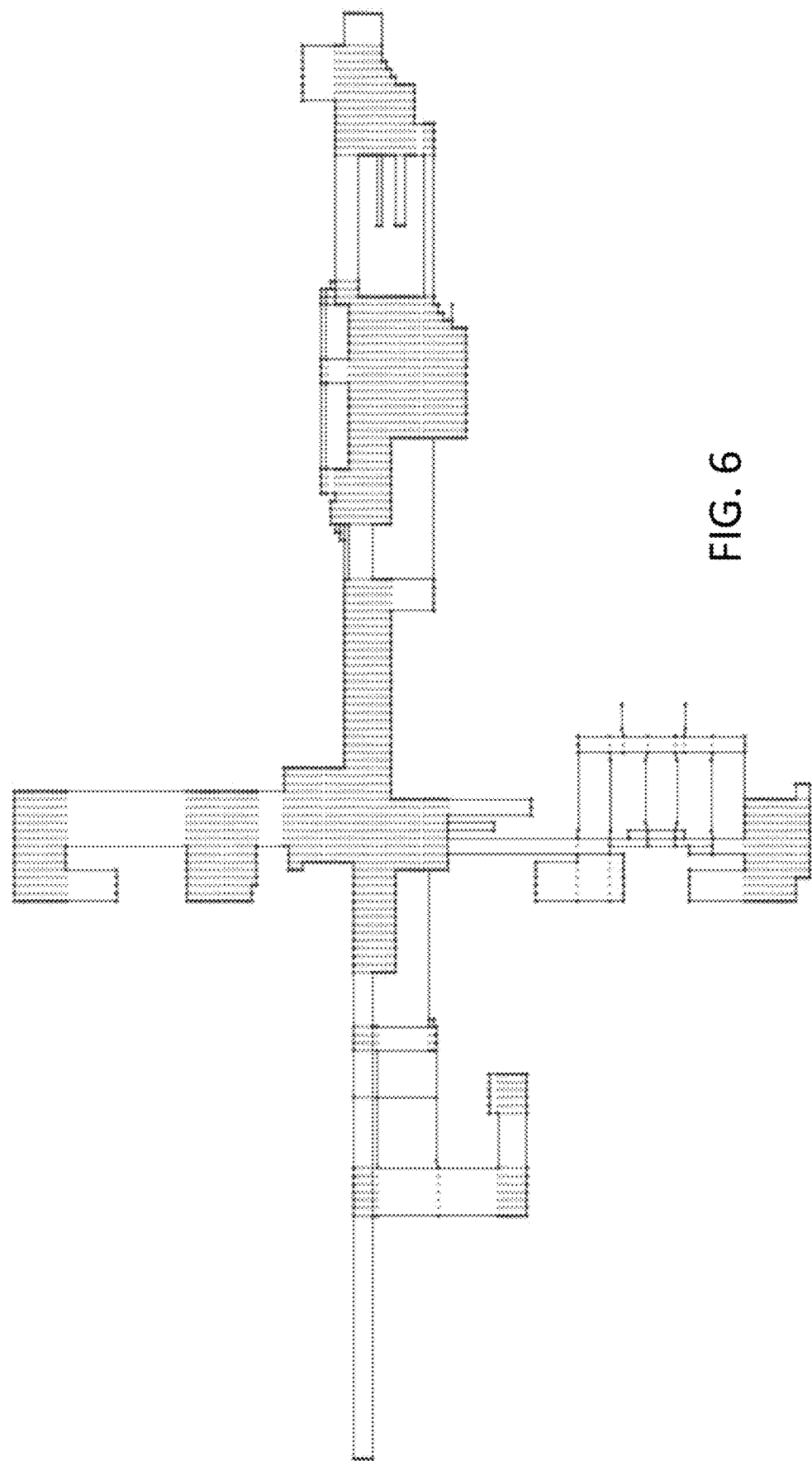

METHOD AND SYSTEM FOR FINGERPRINTING SURVEY

CROSS REFERENCE TO RELATED APPLICATIONS

This application claims priority from and benefit of U.S. Provisional Patent Application Ser. No. 62/594,640, filed Dec. 5, 2017, which is entitled "METHOD AND SYSTEM FOR AUTOMATIC AND EXPEDITED SURVEY," which is assigned to the assignee hereof and is incorporated by reference in its entirety.

FIELD OF THE PRESENT DISCLOSURE

The present disclosure relates to positioning techniques that employ a fingerprinting strategy to match patterns of signals with known locations. More specifically, a system and method are provided for creating an improved survey route that traverses an area so that fingerprint signatures may be collected and correlated with known locations.

BACKGROUND

Portable electronic devices, such as those configured to be handheld or otherwise associated with a user, are employed in a wide variety of applications and environments. Increasingly, such devices are equipped with one or more sensors or other systems for determining the position or motion of the device. Notably, devices such as smartphones, tablets, smart watches or other devices may feature Global Navigation Satellite Systems (GNSS) receivers, low cost Micro Electro-Mechanical Systems (MEMS) inertial sensors, barometers and magnetometers. One important type of information that may be determined are navigation solutions for the portable device, which may include position, velocity and attitude, position and attitude, position and velocity, position and speed, attitude alone or other combinations of these quantities. The navigation solution may also include other related quantities, such as the quantities used for the errors in input data. Reference-based techniques employ an absolute source of navigational information, such as GNSS as noted, but other examples of absolute navigational information include WiFi™ positioning, cellular tower positioning, Bluetooth™ positioning beacons and the like, which generally rely on trilateration and/or triangulation strategies. However, some mass market applications require seamless positioning capabilities in all kinds of environments such as malls, offices or underground parking lots. In the absence of GNSS signals in indoor environments, an Inertial Navigation System (INS) may be used by employing techniques such as dead reckoning to help determine position. INS is a self-contained and/or "non-reference based" technique that utilizes inertial sensors within the moving object and do not depend upon external sources of information that can become interrupted or blocked. Motion sensors are self-contained within the moving object and measure motion, such as through the use of gyroscopes to measure the object's rate of rotation/angle and accelerometers to measure the object's specific force (from which acceleration is obtained). Using initial estimates of position, velocity and orientation angles of the moving object as a starting point, the INS readings can subsequently be integrated over time and used to determine a navigation solution. Typically, measurements are integrated (mathematical integration which is a calculus operation) once for gyroscopes to yield orientation angles and twice for accelerometers to yield position of the moving object incorporating the orientation angles. Thus, gyroscope measurements will undergo a triple integration operation during the process of yielding position. Integrated navigation techniques usually integrate (i.e. combine) reference-based or absolute navigational information with self-contained or non-reference based navigation information. Integrated navigation techniques may employ state estimation techniques, such as a Kalman filter, an extended Kalman filter, a particle filter, or others, which have characteristics including a prediction phase and an update phase (which may also be termed a measurement update phase). A state estimation technique also uses a system model and measurement model(s) based on what measurements are used. The system model is used in the prediction phase, and the measurement model(s) is/are used in the update phase.

Due to the integration operations (the mathematical integration as in calculus), motion sensor-based techniques may fail to provide adequate performance by themselves, particularly over longer durations due to significant performance degradation from accumulating sensor drifts and bias. As such, positioning technologies relying solely on motion sensors may not satisfy all requirements for seamless indoor and outdoor navigation applications. As a result, alternative positioning techniques that can provide strong coverage in areas where access to other reference-based positioning is degraded or denied have been developed. One class of techniques is known as "fingerprinting," and relies on recording patterns of electromagnetic signals at known locations within an area for which position information may be desired. When a device subsequently measures a pattern of received signals that is correlated with a known location, that location may be used to determine the position of the device and/or to aid another positioning technique, such as through integration with the INS techniques noted above. A suitable example of signals that may be used for fingerprinting may be based on the communication signals for an IEEE 802.11 Wireless Local Area Network (WLAN), commonly referred to as "WiFi." However, many different electromagnetic signals are suitable for location determinations using fingerprinting, including other wireless communication signals such as Bluetooth™ and radiofrequency identification (RFID) or environmental signals such as magnetic fields.

As noted, a fingerprint database must be built to correlate the signal patterns with known locations. Unfortunately, building these databases is a time-consuming and resource-intensive procedure. Generally, one or more surveys are performed during which the signal fingerprints are recorded. In part, the quality of the survey depends on planning the routes taken while the survey is conducted. Using the planned routes, one or more surveyors, either persons or automated machines, collect measurements of signals while logging position. Conventionally, the routes must be manually designed to cover the desired area, which constitutes a tedious and expensive process. It will be appreciated that the routes should meet various criteria, such as covering points of the area from a sufficient number of directions, satisfying a minimum distance threshold associated with the misalignment or other constraints of the technique used to determine the locations at which the signals are recorded (e.g. pedestrian dead reckoning (PDR), satisfying minimum and maximum distance thresholds between turns of the route, satisfying minimum and maximum route lengths, ensuring that turns by surveyors are performed at visible landmarks and others. Due to the demands of these criteria, the task of manually planning the routes is expensive and time-consuming. Moreover, a manual process is not scalable. For example, manually planning routes to construct a fingerprinting map may be impractical in contexts such as a major retailer that may have 1000s of stores or a underground transportation network spanning through a whole city. Accordingly, it would be desirable to significantly reduce the level of effort in generating and maintaining fingerprinting databases by improving the route to be used for conducting the survey. Similarly, it would also be desirable to automate and expedite the planning of the routes for the surveyors while meeting criteria such as those noted above. The techniques disclosed in these materials satisfy these and other needs.

SUMMARY

As will be described in detail below, this disclosure includes a method for providing a survey route for building fingerprint maps for an area. The method may include obtaining map information for an area, wherein the map information comprises a grid of nodes and links, transforming the grid to a directed graph comprising vertices and edges, generating an improved tour that entirely traverses the directed graph by traversing each edge and providing at least one survey route based at least in part on the tour.

This disclosure also includes a system for providing a survey route, having remote processing resources including at least one processor that is operative to obtain map information for an area, wherein the map information comprises a grid of nodes and links, transform the grid to a directed graph comprising vertices and edges, generate an improved tour that entirely traverses the directed graph by traversing each edge and provide at least one survey route based at least in part on the tour.

BRIEF DESCRIPTION OF THE DRAWINGS

FIG. 6 is a schematic representation of an area to be surveyed after identification of boundary and non-boundary vertices according to an embodiment.

DETAILED DESCRIPTION

Figure 1:
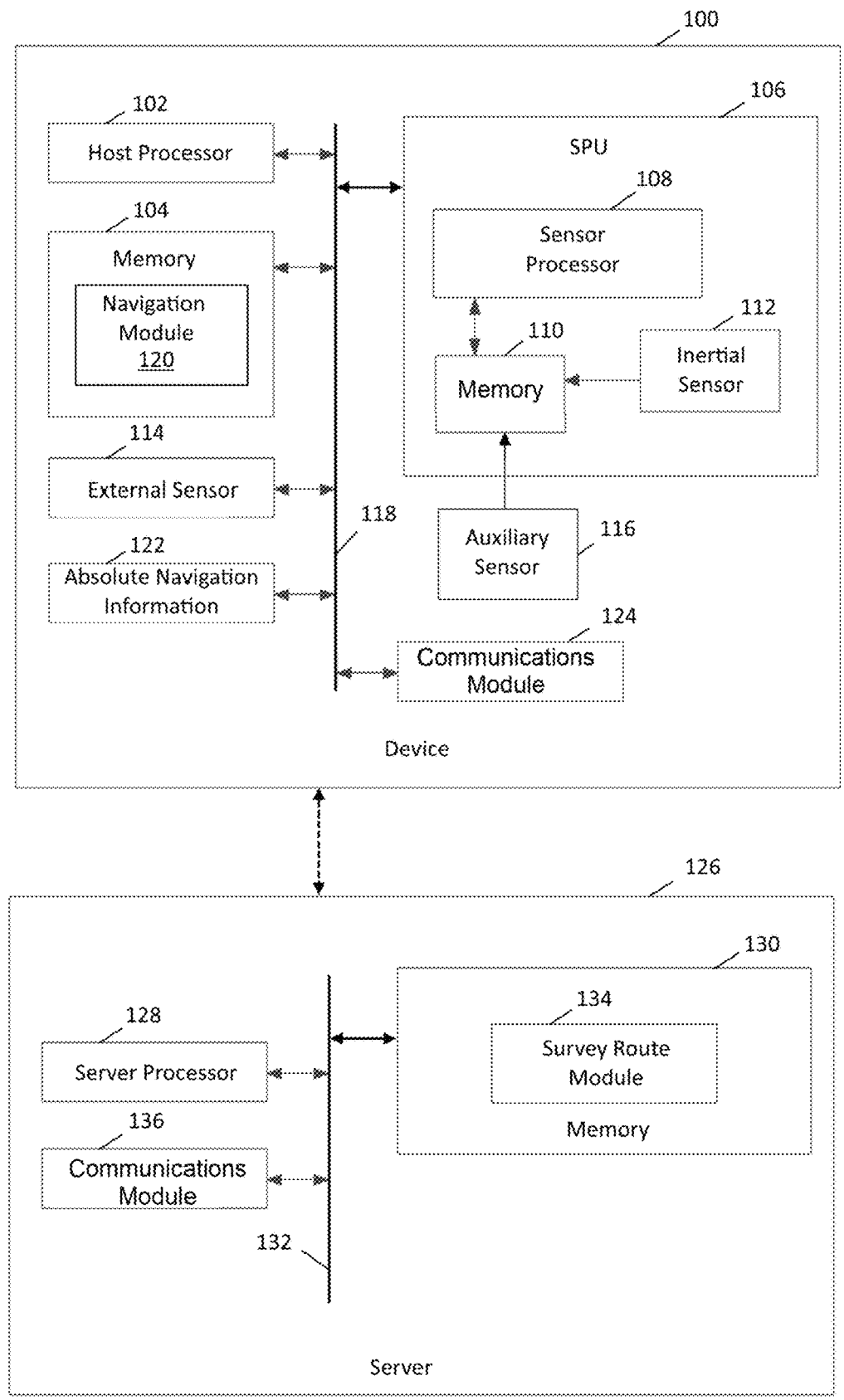
FIG. 1 is schematic diagram of a system for providing a survey route according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting. It is also to be understood that terms of art as used herein are to be given their accepted meanings known to one of ordinary skill in the art. Where appropriate, terms may also be given explicit definitions in the specification to convey their intended meaning.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

According to the techniques of this disclosure, systems and methods are provided for providing a survey route for use in building a fingerprint map of suitable signals for a given area. In the context of this disclosure, a survey route is a path that may be followed by a surveyor, either a human user or an automated platform/vehicle or other conveyance transporting the device, to generate a map of recorded signals for the area being surveyed. Thus, depending on the size of the area and the characteristics of the surveyor(s), a complete tour that encompasses the entire area may involve one or more survey routes, with each route intended to be followed by a single surveyor. As will be described in the details and examples below, the provided route may be considered to be improved by meeting one or more criteria including representing a full and expedited coverage of the area. Another improvement in some embodiments is providing routes that are more practical to follow and may be tailored to the capabilities of the surveyor. For example, an automated surveyor, such as a robot or drone, may be able to follow the planned route more precisely than a human. Conversely, when the planned route is intended to be followed by a human, greater accommodation may be made for slight variations in the route or by providing checks or using landmarks to help the surveyor maintain the planned route or to provide assurance that the route is being followed properly. Even further, variation may exist in the capabilities of a human surveyor, ranging from a trained individual who may need less guidance to a layperson that may require additional aids. Another exemplary improvement according to some embodiments is tailoring the position of the turns and/or the length of the routes such that an accurate position from PDR may be used with the recorded measurements of the signals when building the map.

In one aspect, the techniques of this disclosure involve representing the area being surveyed as a grid map having a plurality of nodes that are connected by links. The improvements in the survey route noted above may be appreciated in the context of this grid. For example, a complete survey that fully covers the area may require that each link be traversed at least once in both directions. Depending on the size of the area being surveyed and the desired granularity of the survey, this represents a difficult and labor intensive process. Correspondingly, one significant improvement may be ensuring full coverage of the area while reducing the retracing of portions of the path. Thus, while the planned route should traverse each link from both directions, traversing a link in the same direction multiple times may be reduced or completely avoided to expedite the survey. As one illustration, this criterion may be considered to be optimized by providing a survey route that passes by each link once and only once in each direction.

As another example, an improvement in the survey route may represent a more usable path to follow. To help illustrate, if the area being surveyed as one or more wide portions, the grid map corresponding to the area may be relatively dense, with many of the nodes and links not being associated with known landmarks or other physical features of the area. Therefore, a survey route having improved usability may cover the grid in such a way as to increase the number of turns that are planned at known landmarks or other references, known as a benchmark point. When insufficient references exist, such as when the area includes several long and wide open spaces or areas, such as long and wide hallways among others, it may be desirable to manipulate the generated grid to make the survey route more usable.

In yet another aspect, the techniques of this disclosure also involve assessing the degree to which the survey route is followed. As will be appreciated, this information may be used to validate or assign a degree of confidence to the generated fingerprint map. The assessment may be performed in real-time as the surveyor is traversing the route, so that portions of the route may be repeated if necessary or to reduce the chance of a mistake propagating and corrupting subsequent measurements. Alternatively or in addition, the assessment may be performed after some or all of the route has been traversed.

To help illustrate these aspects, a representative system for providing a survey route is schematically depicted in FIG. 1, with device 100 represented by high level schematic blocks. As will be appreciated, device 100 may be implemented as a device or apparatus, such as a handheld device that can be moved in space by a surveyor and its motion, location and/or orientation in space therefore sensed. For example, such a handheld device may be a mobile phone (e.g., smartphone, cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices. Such devices may be associated with a platform that conveys the device. The platform may be a human surveyor, as in the example of a smartphone being carried as the surveyor walks or otherwise traverses the route. The platform may also be considered a vehicle or vessel that conveys the surveyor and the device. In some embodiments, the platform conveying the device may be driven by a human user, involving any suitable guidance or control, including direct or remote control. Alternatively, the platform itself may be automated and may convey the device without the need for a human operator. Still further, the device may be dedicated to the function of surveying and in some embodiments may be capable of automated motion on its own without a separate platform. Accordingly, the dedicated device may be propelled or guided by a human surveyor or may be automated, such as in the form of a robot or drone.

Although the device may be transported or conveyed in the direction of movement of the platform depending on the embodiment, its orientation and motion within the platform may not be constrained. Returning to the example of the smartphone, it may be held in the surveyor's hand and employed in a variety of orientations or carried in a pocket, holster, bag or other manners. In other examples, the device may be strapped to the platform, such as fixed to a robot or vehicle, or may be non-strapped. When non-strapped, the mobility of the device may be constrained or unconstrained within the platform and as a result, circumstances may exist such that the device can be tilted to any orientation with respect to the surveyor or platform. For example, a device may be constrained within a platform by being deposited in a cradle, holder or the like. Depending on the design, some motion may still be possible, but that motion is nevertheless constrained in a substantial manner. Likewise, a constrained device may repositioned while still being retained, such as when rotated from portrait to landscape or vice versa. Thus, the device is constrained, but may be able to pivot around an axis. Constrained devices are not considered strapped because their mounting is not permanent and/or allow some types of motion. Conversely, an unconstrained device is not connected in a constraining way to the platform, such as when the device is being held and freely manipulated by a user rather than being placed in a holder, cradle, or belt-clip for example. It should be understood that constrained and unconstrained are used to represent relatively different degrees of restriction. Thus, while being unconstrained may refer to being held by a user, the device is nevertheless not floating freely in space, but is less restricted than a device held in a cradle or belt-clip for example.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated motion processing unit (SPU™) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, SPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure specific forces along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using Micro Electro Mechanical System (MEMS) to be integrated with SPU 106 in a single package. Exemplary details regarding suitable configurations of host processor 102 and SPU 106 may be found in co-pending, commonly owned U.S. patent application Ser. No. 11/774,488, filed Jul. 6, 2007, and Ser. No. 12/106,921, filed Apr. 11, 2008, which are hereby incorporated by reference in their entirety. Suitable implementations for SPU 106 in device 100 are available from InvenSense, Inc. of Sunnyvale, Calif.

Alternatively or in addition, device 100 may implement a sensor assembly in the form of external sensor 114. This is optional and not required in all embodiments. External sensor may represent one or more sensors as described above, such as an accelerometer and/or a gyroscope, which output data for use in deriving a position. As used herein, "external" means a sensor that is not integrated with SPU 106. Also alternatively or in addition, SPU 106 may receive data from an auxiliary sensor 116 configured to measure one or more aspects about the environment surrounding device 100. This is optional and not required in all embodiments. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, SPU 106 and other components of device 100 may be coupled through bus 118, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to derive navigation solutions for device 100 as the survey route is traversed may be implemented through navigation module 120 as a set of suitable instructions stored in memory 104 that may be read and executed by host processor 102, although it should be realized that other implementation may also be employed. The navigation solution(s) used to derive the surveyor trajectory may include any suitable information related to the position, motion and/or orientation of portable device 100. Although discussed primarily in the context of dead reckoning, which may be considered a self-contained strategy, navigation module 120 may employ a reference-based strategy, another self-contained strategy, or any combination of strategies to provide any desired degree of location awareness capabilities. For example, navigation module 120 may employ inertial navigation techniques utilizing sensor data, such as from inertial sensor 112 and/or external sensor 114, as obtained for a current sensor epoch to derive a navigation solution for that epoch. In some embodiments, the navigation solutions derived by navigation module 120 represent contemporaneous determinations of information for device 100. Although some transmission, some possible buffering, and processing time may be required, the results are at least near real-time (there could be some possible latencies) and may use any information available up until the time each navigation solution is derived. In other embodiments, the navigation solutions may be derived by navigation module 120 or equivalent processing resources at a subsequent time as an offline or post-processing operation. Still further, navigation module 120 may also be configured to determine a motion mode that indicates the surveyor's motion patterns, which may include without limitation, walking, driving, running, going up/down stairs, riding an elevator, walking/standing on an escalator, and other similar motion patterns.

Optionally, navigation module 120 may also use a source of absolute navigation information 122 for use with a reference-based strategy, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in all embodiments. Navigation module 120 may also be configured to use information from a wireless communication protocol to provide a navigation solution determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Further, device 100 typically includes a communications module 124 for transmitting and/or receiving information, including the positions derived by navigation module 120.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and SPU 106, for example, to transmit desired sensor processing tasks.

Since one of the functions of device 100 when traversing the survey route is to record signal measurements at multiple positions along the route, a variety of strategies may be employed depending on the type of fingerprint map being generated and the nature of the signals being recorded. For a WiFi-based fingerprint map, device 100 may record the representative characteristics of radio frequency signals used for wireless networking, such as received signal strength indication (RSSI) for transmissions from access points within range using communications module 124, provided it is equipped for a WiFi protocol. Likewise, communications module 124 may also be used to record measurements for radio frequency signals related to other wireless communication protocols as warranted. Alternatively or in addition, a dedicated sensor may be used to record the fingerprint measurements, such as in the form of external sensor 114 and/or auxiliary sensor 116. For example, when generating a magnetic fingerprint map, external sensor 114, auxiliary sensor 116 or another sensor may be a magnetometer. Likewise, for other signals, which may be any electromagnetic signal, any appropriate sensor may be employed.

In this exemplary system, device 100 communicates raw sensor data, including the signals being recorded, and/or navigation solutions derived to server 126. In some embodiments as noted above, device 100 determines navigation solutions in real-time as the survey route is traversed. Alternatively, only raw sensor data may be sent to server 126, which may derive the positions of device 100 and correlate them with the recorded signals. When the position determinations are performed by server 126, they may also be derived in real-time, given any communication delay, or may be performed at a subsequent time such as for example in an offline or post-processing operation as noted above. It will be appreciated that strategies involving real-time navigation solution determination benefit by allowing assessment of the adequacy of the route as it is being traversed. One suitable architecture of server 126 is depicted using high level schematic blocks in FIG. 1, and may include server processor 128 that is in communication with memory 130 over bus 132. As will be described in further detail below, server processor 128 may execute instructions stored in memory 130, including those represented by survey route module 134. Server 126 may also include a communications module 136 to receive raw sensor data or positions for device 100 derived by navigation module 120. Communications between device 100 and server 126 may employ any suitable protocol. For example, a shorter range, low power communication protocol such as BLUETOOTH®, Zig-Bee®, ANT or a wired connection may be used or a longer range communication protocol, such as a transmission control protocol, internet protocol (TCP/IP) packet-based communication, accessed using a wireless local area network (WLAN), cell phone protocol or the like may be used. In general, the system depicted in FIG. 1 may embody aspects of a networked or distributed computing environment. Device 100 and server 126 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Any or all of the functions described with respect to device 100 and server 126 may be performed by any number of discrete devices in communication with each other, or may be performed by device 100 itself in other suitable system architectures. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, server processor 128, a dedicated processor or any other processing resources of device 100, server 126 or other remote processing resources, or may be implemented using any desired combination of software, hardware and firmware.

Figure 2A:
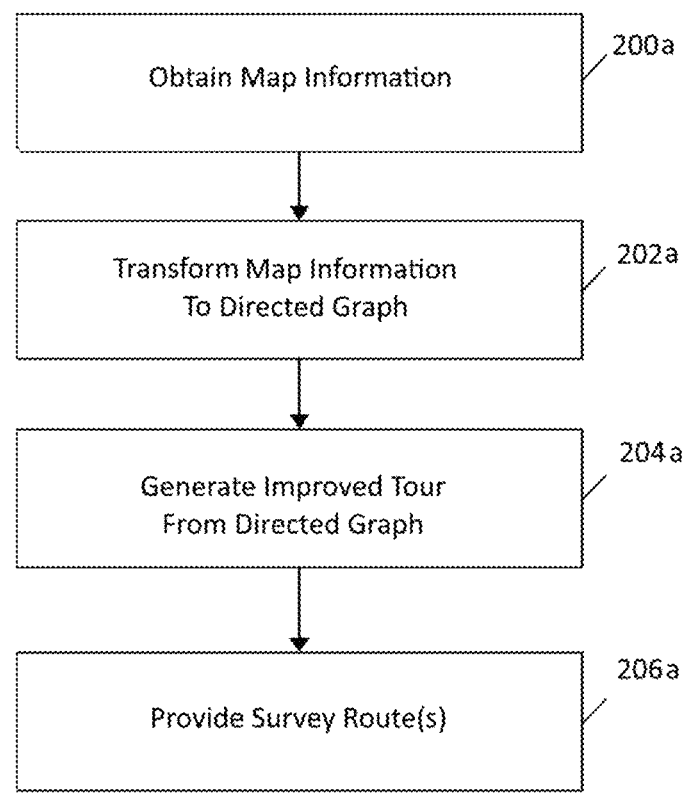
FIG. 2A is a flowchart of a routine for providing a survey route according to an embodiment.

A representative routine involving the techniques of this disclosure is depicted in FIG. 2A. These operations may be implemented by survey route module 134 in some embodiments, but as noted, any or all of these aspects may be performed by other processing resources of the system, including those associated with device 100. Beginning with 200a, map information for an area to be surveyed is obtained. The map information may comprise a grid of nodes and links or they may be generated from the map information. In 202a, the grid is then transformed to a directed graph comprising vertices and edges, with the vertices relating to the nodes and the edges relating to the links. Each vertex may be connected to the vertices within its vicinity by edges. Since it is a directed graph, the number of edges in the graph is double the number of links in the grid. Use of a directed graph facilitates the generation of a tour that covers each link in both directions. In 204a, an improved tour may be generated that entirely traverses the directed graph by traversing each edge. Starting at a given node, the tour traverses all edges in the directed graph as will be discussed in further detail below. In some embodiments, at least one of the improvements associated with the tour may be that each edge is traversed once and only once to expedite the survey. Based on the improved tour, at least one survey route is provided in 206a that may be used by an automated or human surveyor to conduct the survey and generate a fingerprint map.

In one aspect, transforming the grid to the directed graph may include providing a path from every vertex to any other vertex. Further, each link of the grid may be represented with one inward edge and one outward edge.

In one aspect, generating the tour may include deactivating each edge after the generated tour traverses it. An edge may be identified as a bridge so that the generated tour does not traverse it. An edge may be identified as a bridge if traversing that edge breaks the directed graph into two unconnected graphs. Generating the tour may also include sequentially adding edges to the tour that are edges that are not identified as bridges and/or edges that are identified as the only active edge of a vertex. An edge may be selected to be sequentially added to the tour from among a straight edge and a turn edge for a given vertex based at least in part on a distance to a previous turn. The straight edge may be selected when the distance to the previous turn is below a threshold and the turn edge may be selected when the distance to the previous turn is above a threshold. A random selection may be made among the straight edge and the turn edge when the distance to the previous turn is between two thresholds.

In one aspect, generating the tour entirely traverses the directed graph by traversing each edge only once.

In one aspect, providing the at least one survey route based at least in part on the tour may include providing a plurality of routes wherein each route has a route length within a predetermined range. 83. In one aspect, the provided survey route may be traversed with at least one device, wherein each device may include an integrated sensor assembly configured to output data representing motion of the device. Signal measurements may be recorded with each device at a plurality of positions determined based at least in part on the motion data, wherein the signal measurements are at least one of wireless networking signals, radio frequency signals and magnetic field signals. A fingerprint map of the area may be built based at least in part on the determined positions and the recorded signal measurements.

In one aspect, the device may be configured to be conveyed automatically or may be configured to be conveyed by a human.

In one aspect, the directed graph may correspond to the area as a whole.

In one aspect, the grid may be clustered into a plurality of zones, wherein each zone corresponds to one directed graph. Clustering the grid may include a k-means technique. The k-means technique may include an objective function and may involve initializing centroids, assigning vertices of the directed graph to each centroid, updating positions of the centroids based at least in part on the assigned vertices and repeating the assigning and updating until positions of the centroids converge.

In one aspect, the directed graph may be decomposed to reduce a number of turns in the generated tour. Decomposing the directed graph may include identifying boundary vertices or boundary nodes, generating boundary to boundary paths, segregating boundary to boundary paths into a first pool and a second pool based at least in part on an intersection count of each boundary to boundary path and constructing two directed graphs corresponding to the first pool and the second pool of boundary to boundary paths.

In one aspect, traversal of the provided survey route may be assessed by comparing characterizations of the traversed route to a reference, such that the traversed route characterizations are based at least in part on the motion data and the reference may be based at least in part on the provided survey route. The assessment may be an in-route assessment and/or a post-route assessment. The provided survey route may be scheduled for another traversal based on the assessment. Traversal of a next survey route may be scheduled such that the next survey route is selected from a pool of survey routes based at least in part on current proximity. The pool of survey routes may include the provided survey route if a traversal of the provided survey route fails the assessment.

In one aspect, the assessment may be an in-route assessment and the traversed route characterizations may include a distance traveled since a previous benchmark point, a difference between corresponding turn angles, and a difference between corresponding segment lengths. Discontinuation of a traversal of the provided survey route may be directed before completion based at least in part on the assessment. Traversal of a next survey route in sequence after the discontinuation may be scheduled such that the next survey route is selected from the provided survey route and another survey route based on proximity to a start of the next survey route when the discontinuation occurs.

In one aspect, the assessment may be an in-route assessment and feedback may be provided during traversal of the provided survey route based at least in part on the assessment.

In one aspect, the assessment may be a post-route assessment that includes a scoring routine performed after traversal of the provided survey route may be complete. The traversed route characterizations may be turn-based and segment-based. Further, the segment-based traversed route characterizations may include any one or any combination of: i) a difference between reference segment length and corresponding trajectory segment length; and ii) a determined straightness factor for at least one segment. The turn-based traversed route characterization may include any one or any combination of: i) a difference between reference turn angles and corresponding trajectory turn angles; ii) identification of missed turns; and iii) identification of extra turns. A traversal of a next survey route may be based on the assessment, such that the next survey route is selected from a pool of survey routes and comprises the provided survey route if a traversal of the provided survey route fails the assessment.

In one aspect, the obtained map information is a geometrical map, such that the method includes processing the geometrical map to generate the grid of nodes and links. Processing the geometrical map information may include clipping obstacles to define a traversable area. Processing the geometrical map information may also include decomposing the traversable area into polygons and inserting nodes within the polygons based at least in part on calculated slopes of the polygons, wherein the inserted nodes are the nodes of the grid. The node insertion may be controlled to provide a desired resolution for the survey. Processing the inserted nodes may establish links of the grid, such that each link has a length greater than a threshold. Processing the grid may identify dummy nodes.

As discussed above, the system for providing a survey route may include remote processing resources such as server 126, such that server processor 128 or another processor is operative to obtain map information for an area, wherein the map information comprises a grid of nodes and links, transform the grid to a directed graph comprising vertices and edges, generate an improved tour that entirely traverses the directed graph by traversing each edge and provide at least one survey route based at least in part on the tour.

In one aspect, at least one processor is operative to receive signal measurements recorded by at least one device at a plurality of positions, wherein each device comprises an integrated sensor assembly configured to output data representing motion of the portable device and the plurality of positions are determined based at least in part on the motion data and wherein the signal measurements are at least one of wireless networking signals, radio frequency signals and magnetic field signals, and construct a fingerprint map of the venue based at least in part on the determined positions and the recorded signal measurements.

In one aspect, at least one processor may be operative to obtain a geometrical map and process the geometrical map to generate the grid of nodes and links.

In one aspect, at least one processor is operative to assess traversal of the provided survey route by at least one device at a plurality of positions, such that each device comprises an integrated sensor assembly configured to output data representing motion of the portable device and the assessment compares characterizations of the traversed route to a reference. The traversed route characterizations may be based at least in part on the motion data and the reference may be based at least in part on the provided survey route. The assessment may be an in-route assessment and/or a post-route assessment. At least one processor may be operative to schedule a re-traversing the provided survey route based on the assessment. At least one processor may be operative to schedule traversal of a next survey route, wherein the next survey route may be selected from a pool of survey routes based at least in part on current proximity and wherein the pool of survey routes comprises the provided survey route if traversing the provided survey route fails the assessment.

In one aspect, the assessment may be a post-route assessment that includes a scoring routine performed after traversal of the provided survey route is complete and/or may be in in-route assessment such that feedback is provided during traversal of the provided survey route based at least in part on the assessment.

In one aspect, the system may include the at least one device. Each device may have a processor operative to assess traversal of the provided survey route by that device at a plurality of positions, such that the assessment compares characterizations of the traversed route to a reference. The traversed route characterizations may be based at least in part on the motion data and the reference may be based at least in part on the provided survey route. The assessment may be an in-route assessment and/or a post-route assessment.

In one aspect, each device may have at least one processor operative to assess traversal in-route, such that the traversed route characterizations include a distance traveled since a previous benchmark point, a difference between corresponding turn angles, and a difference between corresponding segment lengths. At least one processor of each device may be operative to provide feedback during traversal of the provided survey route based at least in part on the assessment.

In one aspect, the device may be configured as a device that may be conveyed by a human user, a device that may be conveyed by a platform propelled by a human user, a device that may be conveyed by a platform driven by a human user, a device that may be conveyed by an automated platform and/or a portable device.

EXAMPLES

The examples set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

Figure 2B:
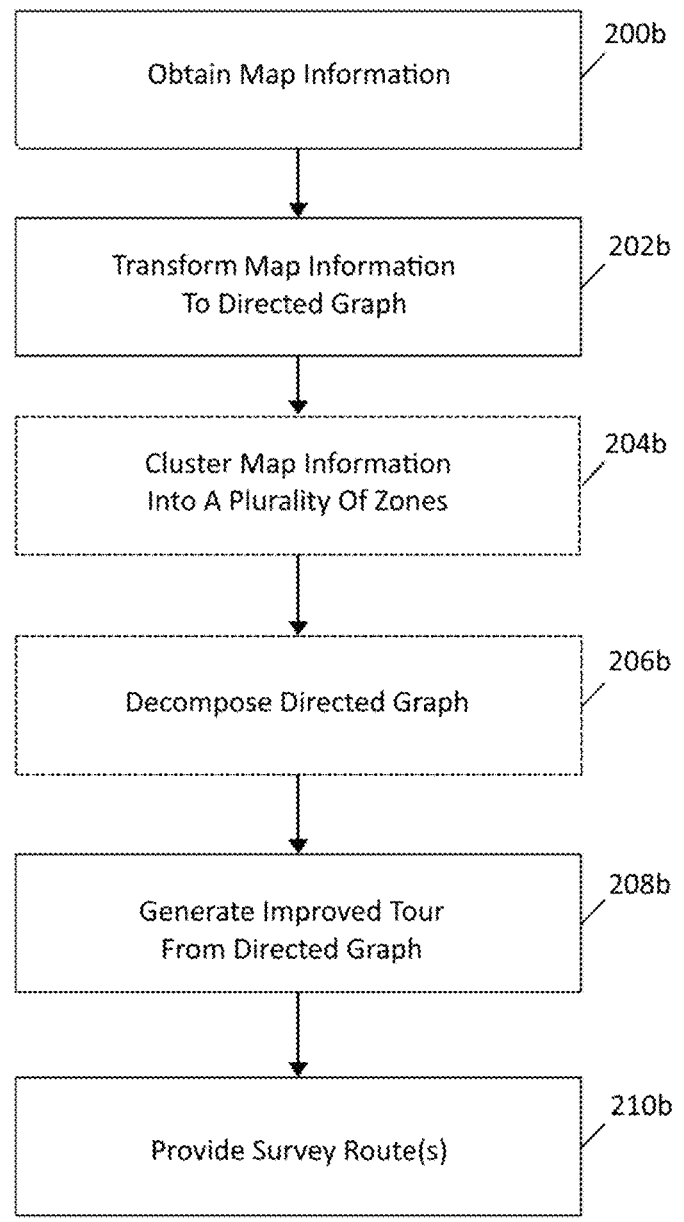
FIG. 2B is a flowchart of a routine for providing a survey route according to another embodiment.

As described above, the techniques of the disclosure involve providing a survey route automatically to expedite the survey. As an illustration of the techniques, FIG. 2B is a flowchart of a suitable routine that includes similar operations indicated in FIG. 2A, but includes additional, optional operations. Beginning in 200b with using map information represented as a grid of nodes and links and then transforming the map information to a directed graph as indicated by 202b of FIG. 2B. As noted, this routine includes optional operations indicated in 204b to cluster the map information into a plurality of zones such that multiple directed graphs are used and each zone corresponds to one directed graph. Another optional operation represented by 206b is to decompose the directed graph, thereby reducing the number of unmarked turns that will be generated in the tour. Further details regarding these optional operations are given below.

Returning to the operations subsequent to transforming the grid, and after the optional operations of 204b and 206b as desired, the routine progresses to 208b for generating the tour. Finding a path that traverses the entire grid while meeting the requirements associated with recording signals from both directions of each link. As known in the art, a full graph traversal may refer to starting at a node and traversing all nodes in the graph once and only once, such that any resulting solution path may be termed a Hamiltonian Tour (HT). Problems of this nature are classified a Travelling Sales Man Problem (TSP). However, within the context of this disclosure, a full graph traversal instead refers to starting at a node and traversing all edges in the graph once and only once, to provide a solution path known as a Eulerian Tour (ET). Since traversing all edges once and only once is an example of one type of improvement associated with the tours generated by the techniques of this disclosure, some embodiments of the survey route may be ETs. Problems of this type are known in the art as a Chinese Postman Problem (CPP).

Thus, some embodiments of this disclosure transform the grid to an Eulerian Directed Graph. As will be appreciated, a limited subset of undirected and directed graphs contain ET tours. Any graph that has at least one ET tour may be termed a Eulerian Graph (EG), and an EG graph may contain many unique ET tours. As noted above, an ET tour is an improved tour in the sense that it passes by all edges once and only once and it can only exist in an EG. Providing directed graph that meets the requirements of an EG therefore ensures the tour used to provide the survey route is an ET tour.

One requirement for an EG is that all vertices with nonzero degree (a degree of a vertex is its number of outwards edges) must belong to one Strongly Connected Graph (SCG), which is the equivalent of and may also be termed Strongly Connected Component (SCC). For all vertices of a directed graph to belong to one SCG, there must exist a path from every vertex of the graph, to any other vertex in the graph. The directed graph may represents the grid by abstracting every link between a pair of nodes with two edges. In other words, if vertex $v_a$ is linked to $v_b$ in the grid, then the graph would contain two edges representing this link, namely; $(v_a \rightarrow v_b)$ and $(v_b \rightarrow v_a)$. This ensures there is a path between any two pair of vertices in the graph. Another requirement is that the in-degree and the out-degree of every vertex must be the same for the graph. For example, the in-degree of a vertex, denoted by $v_i^{in}$, may refer to the number of edges moving inwards to a vertex, while the out-degree of a vertex, denoted by $v_i^{out}$, may refer to the number of edges moving outwards from a vertex. By modelling the grid so that each link is represented with an inward and an outward edge, this condition may be ensured for the entire graph. Meeting these requirements provides that the directed graph is an EG, and correspondingly, that the generated tour is an ET. Once more, since an ET passes by all edges once and only once, a survey conducted by following a survey route having these characteristics expedites the survey by avoiding any unnecessary retracing of the path.

Any suitable technique may be employed to find an ET solution within an EG. In some embodiments, the techniques used allow for the application of constraints so that desired characteristics of the generated tour are obtained. Another consideration is the time-complexity of the method used and the ability to scale with an increased number of vertices. For the sake of illustration, the following materials describe the application of a technique known as Fleury's method, but this should not be considered limiting and other techniques may be applied as warranted. For example, Heirholzer's algorithm may be used for ET generation, but does not provide as much control over the shape of the generated tour (e.g., min distance between turns.)

Fleury's method involves traversing edges in the graph if the traversed edge, which is deactivated after traversal, does not result in multiple Connected Graphs. It has to be noted that a Connected Graph (CG) is the equivalent of and may also be termed Connected Component (CC). In other words, it should be ensured that all remaining (untraversed) edges belong to one SCG as edges are traversed and deactivated. This may be achieved by checking before deactivating an edge whether it constitutes a Bridge. An edge may be identified as a Bridge if traversing, and therefore deactivating the edge, would break the directed graph into two unconnected graphs. Correspondingly, if an edge is a Bridge, it should not be traversed and consequently deactivated. Whether an edge is a Bridge may be determined using Depth-First-Count (DFC) or Breadth-First-Count (BFC) before and after deactivating a candidate tour edge. Generally, the same number of vertices should be reached before and after the candidate edge is deactivated. If this holds true, then it is safe to traverse (and deactivate) the candidate edge since it is not a Bridge. Correspondingly, when an edge is determined to be a non-Bridge edge, it may be appended to the ET tour.

One benefit associated with the use of Fleury's method is that it is customizable because there are multiple degrees of freedom. During any iteration of the method, a specific vertex is investigated. At this point, several activated edges belonging to the investigated vertex are candidates to become part of the tour. This provides room for selecting the series of edges that would result in producing a route that meets the system requirements discussed above. Therefore, one suitable implementation is in the form of a Constrained Fleury's (CF) method.

Figure 3:
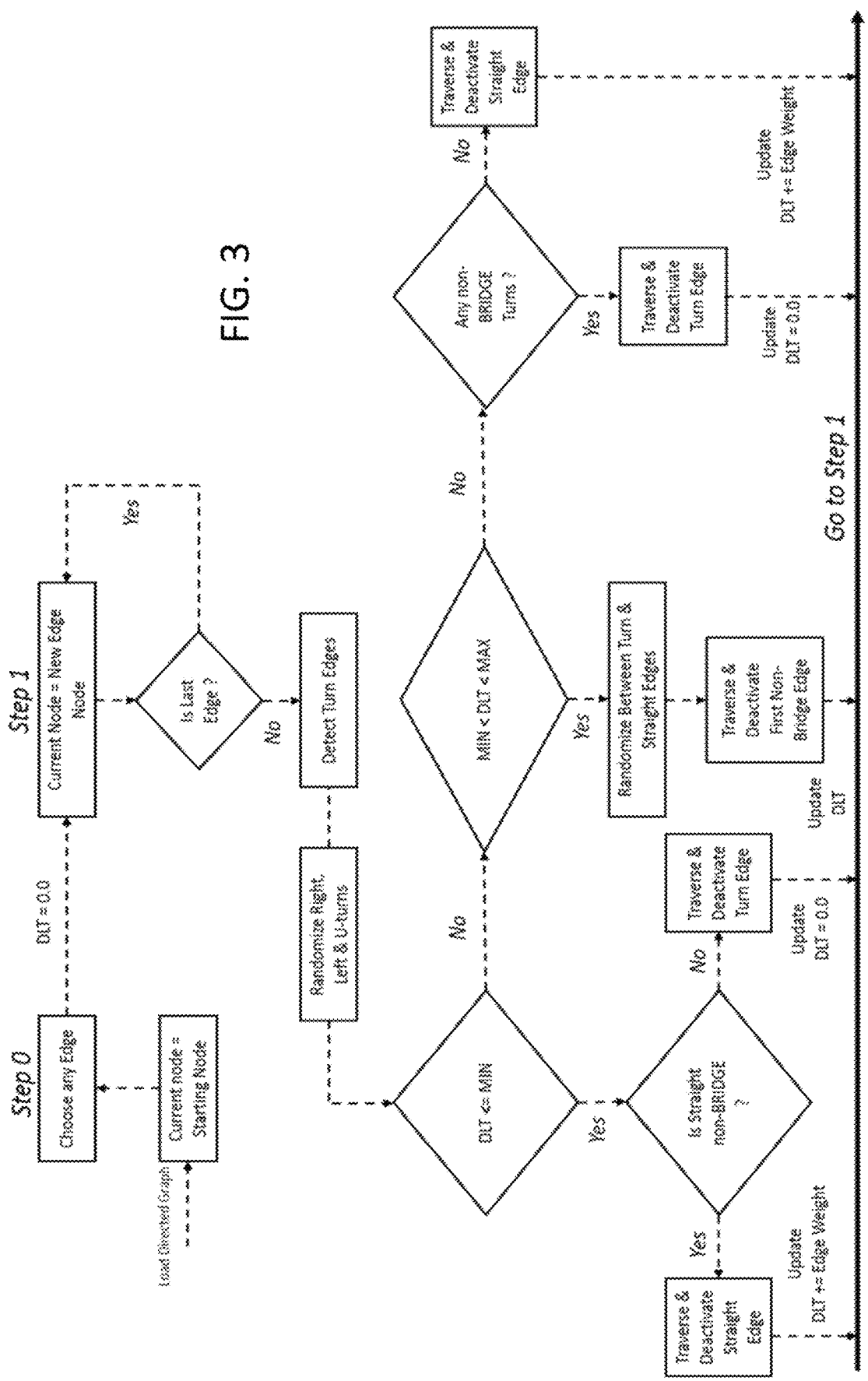
FIG. 3 is a flowchart of a routine for generating a tour for surveying an area according to an embodiment.

To help illustrate, FIG. 3 shows a flowchart for one exemplary embodiment of a CF method that generates a tour to perform a complete survey that fully covers the area by traversing each link once in both directions, corresponding to 208b of FIG. 2B. As indicated by the operations identified as Step 0, the routine may start at any vertex, setting that vertex as the current vertex, denoted by $v_{curr}$, and setting a counter $D_{LT}$ to 0 in order to track the distance to the last turn of the tour being generated. Next, the operations grouped under Step 1 are performed iteratively to generate the tour. At the first stage, it is determined if $v_{curr}$ has only one activated edge and if so, the edge is traversed, deactivated and added to the tour. The next vertex is then fetched and marked as $v_{curr}$ and the determination of whether there is a single activated edge is repeated to traverse, deactivate and add the edge to the tour until a $v_{curr}$ has been fetched that has multiple edges. At this stage, turns are detected and the position of turns in the turns vector are randomized to avoid any bias in selecting among right, left and U-turns. After the first turn edge is chosen as part of the tour, $D_{LT}$ is updated ($D_{LT}=D_{LT}+e_w$) for each straight edge added to the tour, where $e_w$ denotes the weight of the chosen edge. Whenever a turn edge is chosen as part of the tour, $D_{LT}$ is reset to 0. $D_{LT}$ may be used to select among the branches of the routine when a choice between a straight edge and a turn edge exists. $D_{LT}$ may be compared to pre-set (threshold) minimum and maximum distance between turns values. The thresholds may be set to appropriate values based on the system requirements. A first branch of the routine may be performed when $D_{LT}$ is less than the minimum threshold, so that a straight edge is added to the tour if the candidate edge is non-Bridge edge. This operation reduces the possibility of two consecutive turns with a distance between them less than the minimum threshold. When $D_{LT}$ is greater than the minimum distance threshold and less that the maximum distance threshold, another branch of the routine is followed so that straight edge and turns are randomized, and $D_{LT}$ is updated depending on whether a non-Bridge straight or turn edge was added to the tour. When $D_{LT}$ is greater than the maximum distance threshold, priority may be given to the straight edge over turn edges depending on the existence of any non-Bridge turns. The routine may terminate when $v_{curr}$ has 0 active edges, with the result that the generated tour traverses every edge of the graph once and only once.

An optional operation (indicated by the dashed box) that may be performed in 204b of FIG. 2B before generating the tour is to cluster the map information into a plurality of zones such that multiple directed graphs are used where one directed graph corresponds to one of the zones, and each zone corresponds to one directed graph. This optional operation provides grids that have a manageable size to properly generate an improved tour by clustering the map information into a plurality of zones. Notably, some areas to be surveyed may be large enough to divided into more than one area. For example, a grid that spans multiple floors may be broken done into individual floors, so that floor may have a tour for surveying by one or more surveyor(s). Likewise, an underground transportation network covering the entire city may also be clustered into several directed graphs, so that a tour may be generated for survey route(s) independently of each other.

Without limitation, one exemplary technique for clustering employs a k-means technique using the distance between vertices as the vicinity indicator as described in the following materials. Given a graph defined by G={V, E}, V may be a set of vertices $\{v_0, v_1, \ldots v_{n-1}\}$, and E, represented by $\{e_0, e_1, \ldots e_{m-1}\}$, may be a set of edges connecting vertices, with each vertex $v_i$ having a position $(x_i, y_i)$. Initially, the 2D position of k centroids may be set, where k refers to the number of clusters desired. After initialization, the technique iterates between an assignment and an update step until a stop condition is reached. The graph-based k-means technique effectively minimizes the summation of variances between the vertices assigned to a specific cluster and the centroid of the cluster across all clusters. Accordingly, an objective function such as given in Equation (3) may be used to minimize the within-cluster sum of squares, wherein $(x_v, y_v)$ represents the position of the $V^{th}$ vertex assigned to the $k^{th}$ cluster, such that the $k^{th}$ cluster is denoted by a set of vertices $S_k$ and $(u_{x,k}, u_{y,k})$ denotes the position of the $k^{th}$ centroid:

$$\min\left(\sum_{k=0}^{K-1} \sum_{v \in S_k} \left((x_v - u_{x,k})^2 + (y_v - u_{y,k})^2\right)\right)$$

(3)

As noted, an initialization step may be performed to set the position of the centroids, such that C represents the set containing the centroids denoted by $\{c_0, c_1, \ldots, c_{k-1}\}$, where, $c_i$ has a position $\{cx_0, cy_0\}$. The centroids can be initialized as the positions of the K vertices. Another way of initializing the centroids is choosing the position of each centroid such that the k-means technique rapidly converges. For example, this can be done by choosing the position of the centroids as far as possible from each other.

Following initialization, an operation is performed to assign each vertex $v_i$ to a set centered around the centroid $c_j$. The assignment process may be performed by computing the Euclidian distance between $v_i$ and all centroids, so that $v_i$ is assigned to the closest centroid. Hence, each centroid $c_j$ is assigned a set of vertices. The centroid to which each $v_i$ belongs may be computed using Equation (4), where $d_{v_i}^{c_0}$ denotes the Euclidian distance between $v_i$ and $c_0$:

$$C(v_i) = \min\{d_{v_i}^{c_0}, d_{v_i}^{c_1}, \ldots d_{v_i}^{c_{k-1}}\} \quad (4)$$

After assigning each vertex to the nearest centroid, a new position for the centroids is computed in an update operation. This position of the new centroid is the mean position of vertices assigned to the old centroid. The new position of the centroids can be calculated using Equations (5) and (6), wherein $(cx_{i-new}, cy_{i-new})$ denotes the new position of centroid $c_i$ and T is the number of vertices assigned to the old centroid:

$$cx_{i-new} = \frac{\sum_{t=0}^{t-1} x_t}{T} \quad (5)$$

$$cy_{i-new} = \frac{\sum_{t=0}^{t-1} y_t}{T} \quad (6)$$

Figure 4A:
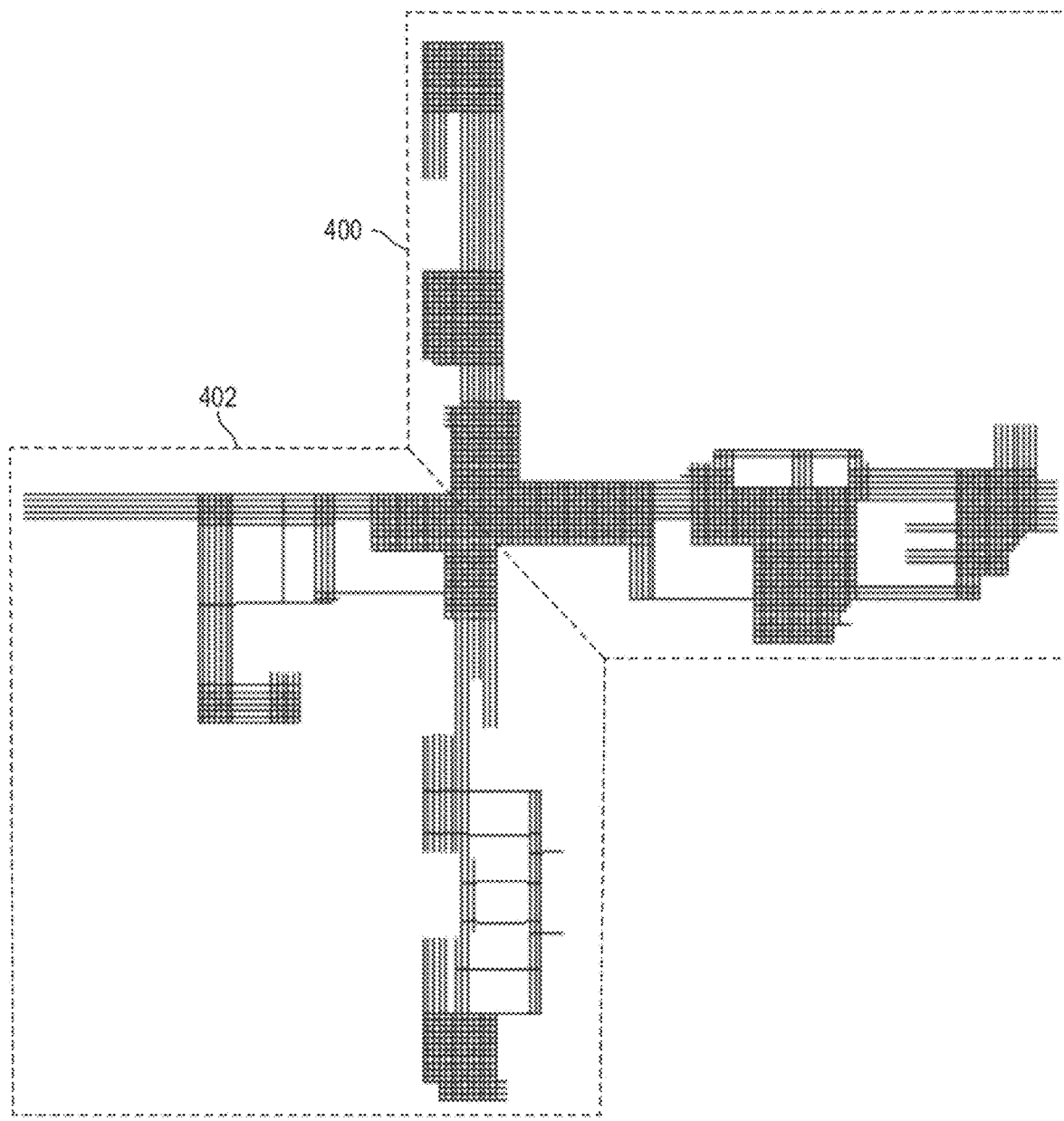
FIGS. 4A-C are schematic representations of three different clustering operations to segregate map information into a plurality of zones according to an embodiment.
Figure 4B:
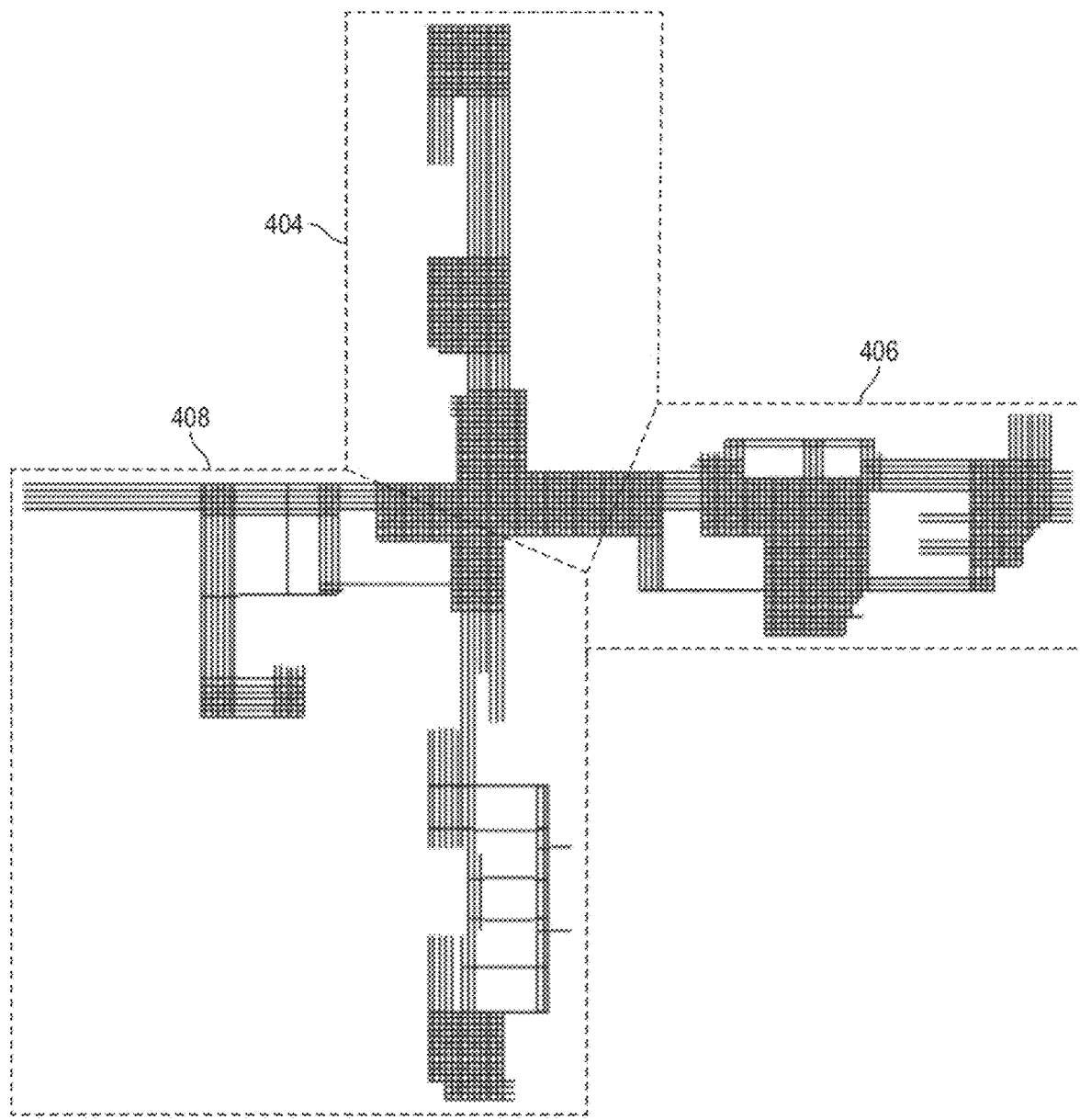
Figure 4C:
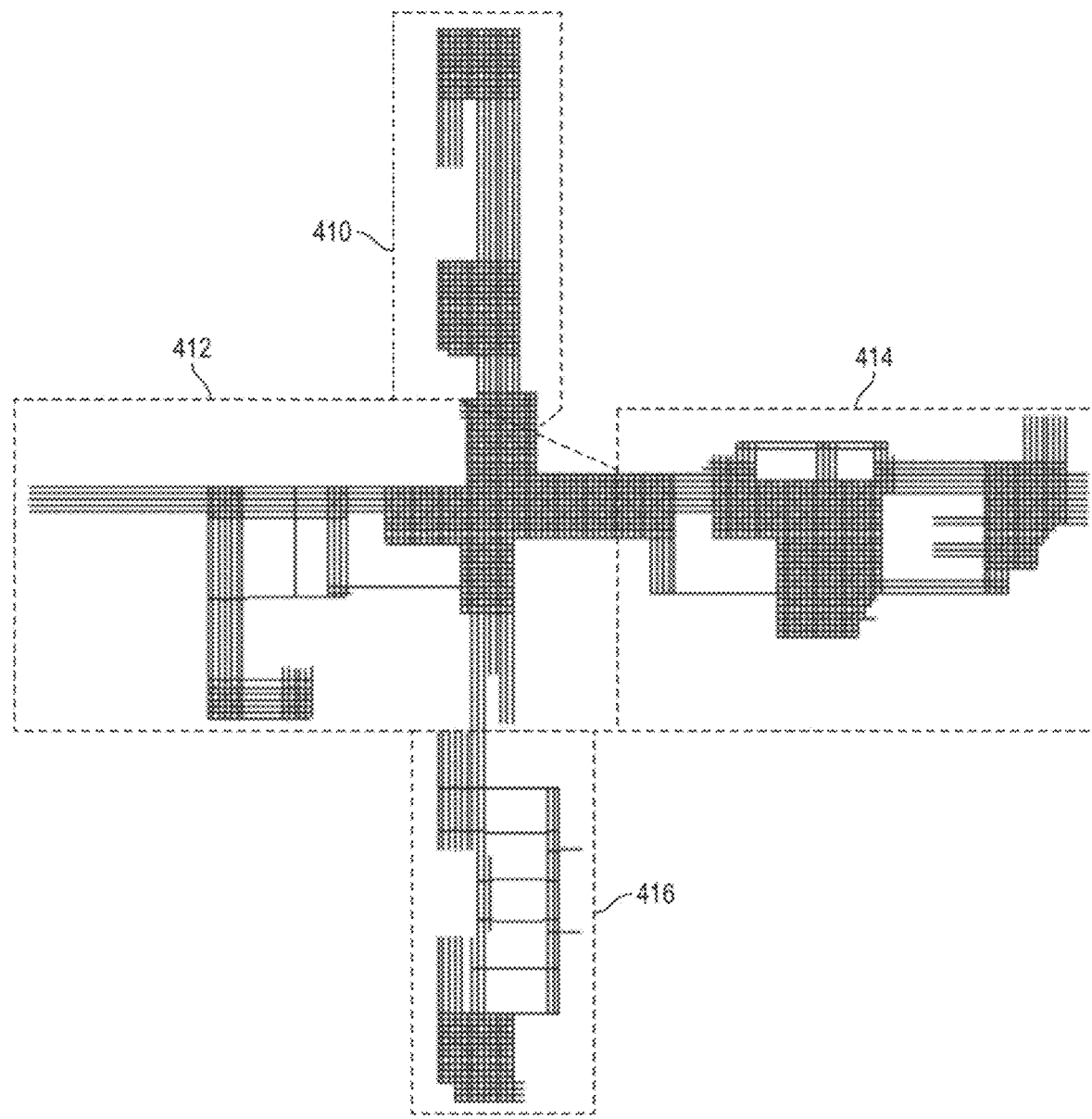

The assignment and update steps may be repeated until the position of the new and old centroids change by less than a desired threshold, such that little or no displacement occurs during the update step. This condition may be satisfied when the mean of the position of vertices within each cluster is the position of the old centroid. To help illustrate, FIGS. 4A-C schematically depict the results of an exemplary clustering operation, with FIG. 4A having 2 clusters denoted by zones 400, 402, FIG. 4B having three clusters denoted by zones 404, 406 and 408, and FIG. 4C having four clusters denoted by zones 410, 412, 414 and 416.

Another optional operation as indicated by 206b of FIG. 2B relates to decomposing the graph based on a usability metric, thereby reducing the number of unmarked turns that will be generated in the tour. As discussed above, one improvement that may be associated with the generated tour is that turns are preferentially chosen to occur at landmarks such as corners in the map to help the surveyor accurately reproduce the survey route. Desirably, this may be performed based on characteristics of the grid, such as when an area has very long and wide corridors with large grid spacing between neighboring nodes. When a grid is very dense, characterized by a relatively small separation between the nodes, many candidate turns may exist and be included in the tour generation. Turns that are not associated with any landmarks like visible corners may be termed Unmarked Turns (UT). When these turns are the dominant turns in the planned tour, it may be difficult for the surveyor to determine when exactly to turn, particularly when the surveyor is a human, and may result in the survey route being followed inaccurately. Accordingly, limiting the number of intersections in the graph may result in less turns, so that turns may be preferentially selected to correspond to landmarks.

Figure 5:
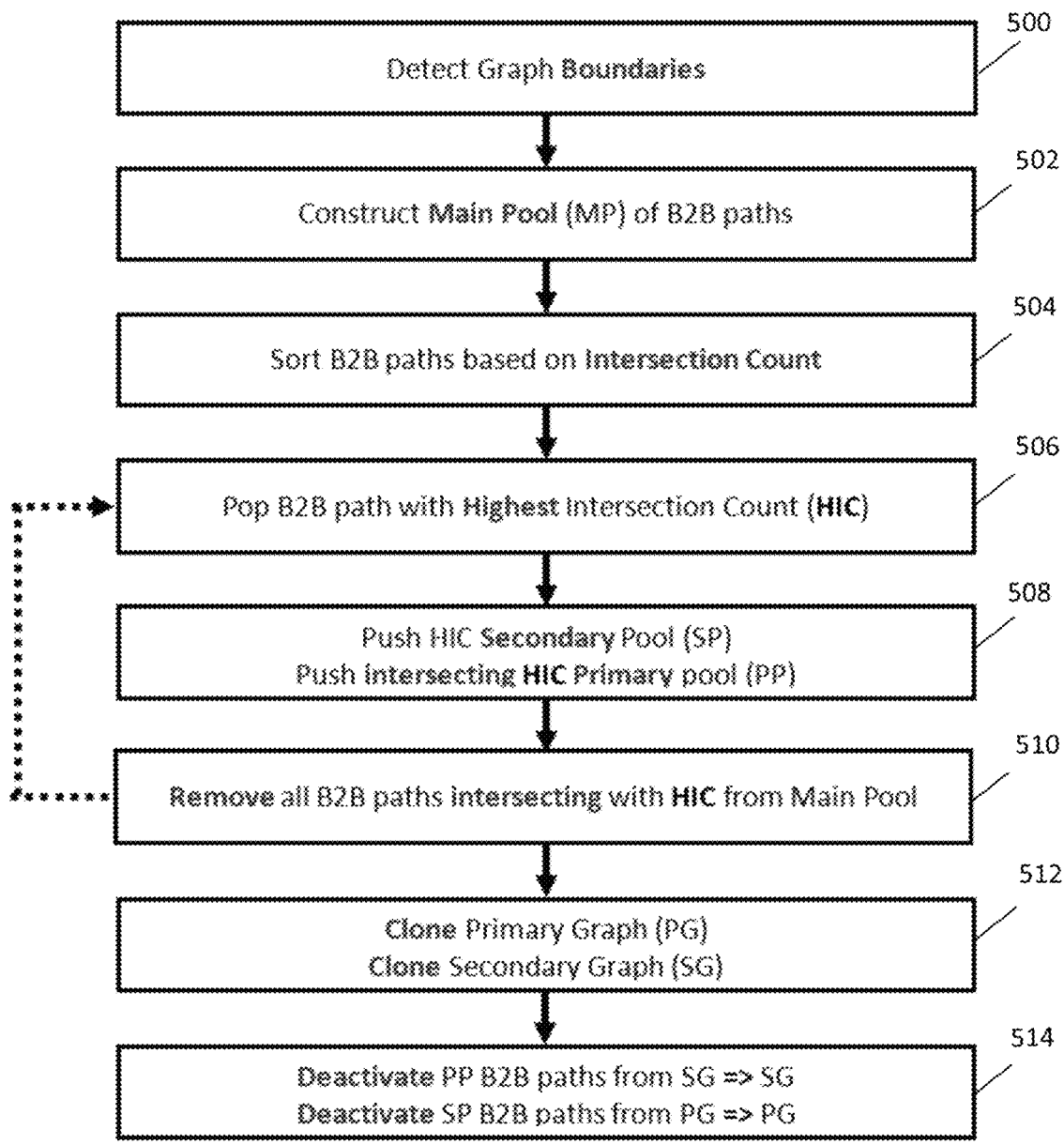
FIG. 5 is a flowchart of a routine for decomposing a directed graph according to an embodiment.

A non-limiting example of a heuristic to reduce the number of unmarked turns is termed the Minimum-Intersection Graph Decomposition (MIGD) Heuristic and described below, but any suitable technique may be employed. It will also be recognized that a benefit of performing some degree of graph decomposition is to reduce the time-complexity when generating the tour. This exemplary form of graph decomposition reduces the number of intersecting paths within the graph, as indicated by the representative routine depicted in FIG. 5. Beginning with 500, exposed vertices and non-exposed vertices are detected. A non-exposed vertex is defined as a node that is directly surrounded by eight nodes, such that four of these surrounding nodes are directly connected to the non-exposed node by links, and the other four nodes are positioned on the two diagonal axes. If any of these eight nodes are missing, then the vertex in question is tagged as a boundary node, otherwise the vertex is considered a non-boundary node. An example of this operation is schematically depicted in FIG. 6, show the dense sets of non-boundary vertices, represented by the lighter dots, each defined by a perimeter of boundary vertices, represented by the darker dots. The boundary nodes are connected by edges.

Figure 7A:
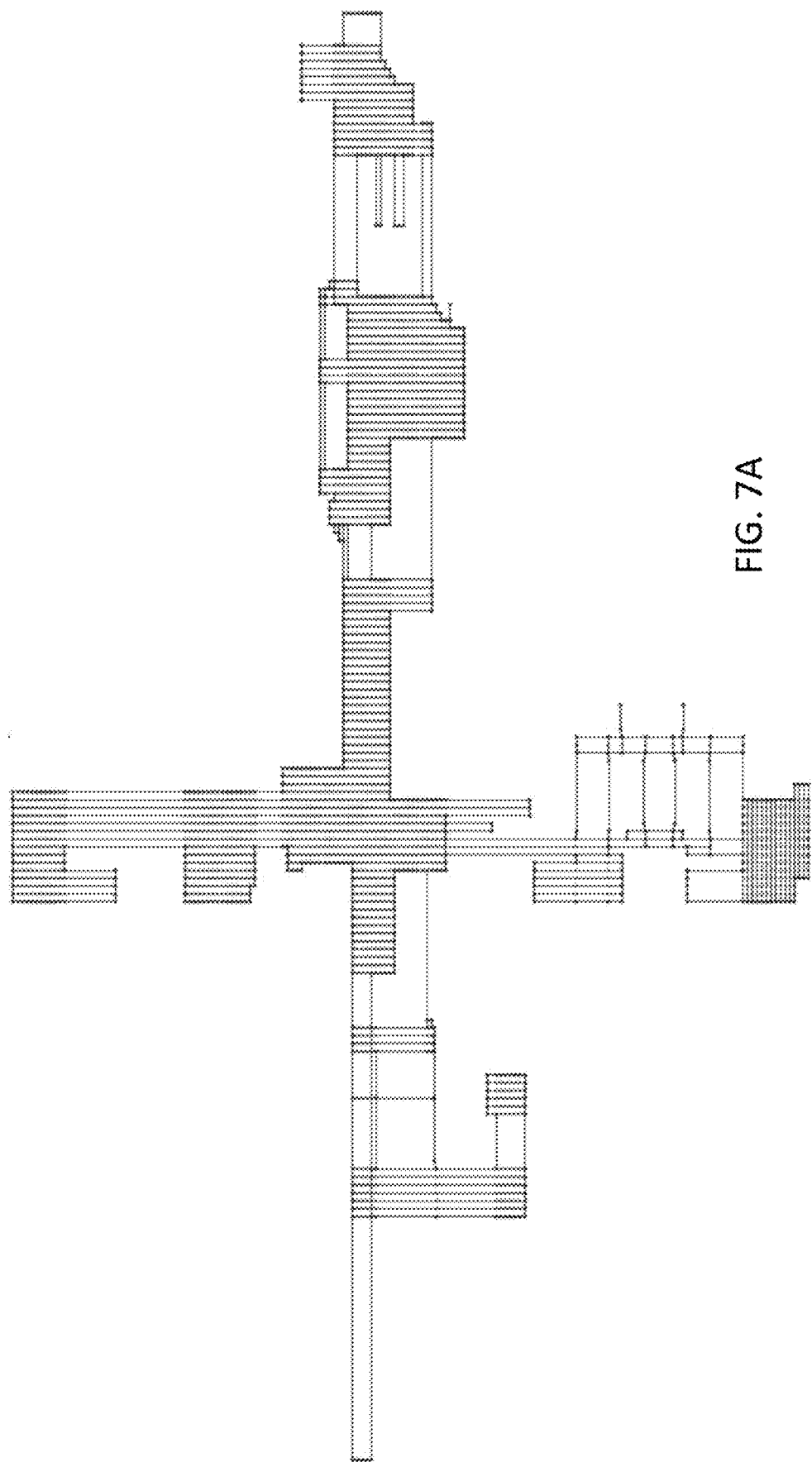
FIGS. 7A and B are schematic representations of the area of FIG. 6 following decomposition into a primary graph, shown in FIG. 7A, and a secondary graph, shown in FIG. 7B, according to an embodiment.
Figure 7B:
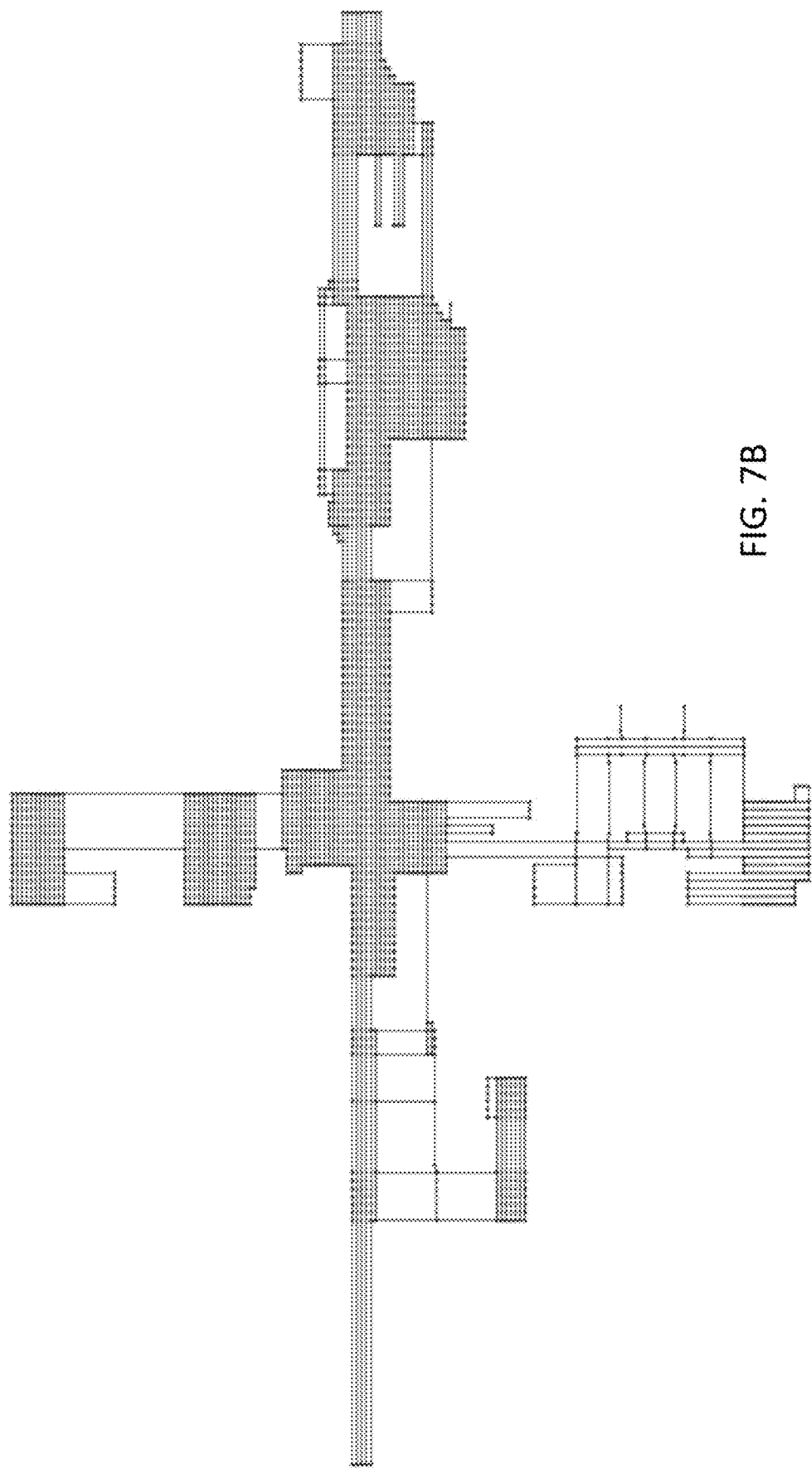

Returning to FIG. 5, the routine then flows to 502, in which the main graph is used to construct Boundary-to-Boundary Paths (B2B). A B2B path is a route that starts from one boundary vertex and moves in a straight (or almost straight) direction until it hits another boundary vertex. During this process, several edges are assigned to the B2B path and a counter keeping track of the number of intersections passed by this path is named an Intersection Count (IC). Every path is associated with a path ID and an IC. All direct edges moving perpendicular (away) from the boundary (wall) are explored, and a B2B path is constructed for each edge. Once all edges are explored, the boundary vertex is marked as visited and removed from the set of unvisited boundary vertices. If a boundary vertex is only connected to boundary vertices, then no B2B path is constructed from this vertex. When a B2B path is constructed, it is pushed to the Main Pool (MP) stack. After all boundary vertices are marked as visited, a quick sort procedure may be used to order the B2B paths in the MP stack with respect to the IC of each path so that the B2B path with the Highest Intersection Count (HIC) is positioned at the front of the MP stack. 118. Thus, in 504, the B2B paths may be decomposed by sorting the MP pool into a Primary Pool (PP) and a Secondary Pool (SP), so that the PP stack contains all B2B paths that are part of the Primary Graph (PG) and the SP stack contains all B2B paths that are part of the Secondary Graph (SG). Initially, the HIC B2B path is taken from the MP stack and pushed to the SP stack in 506. Next, all B2B paths in the MP stack that intersect the selected HIC path are identified, pushed to the PP stack in 508 and removed from the MP stack in 510. This process is performed iteratively by returning to 506 until the MP stack is empty. Hence, the PP and the SP stacks are filled and can be used to construct the PG and the SG graphs in 512 by cloning the original directed graph into two copies; a primary and a secondary graph. Then, the B2B paths in the PP stack are deactivated in the PG graph and the B2B paths in the SP stack are deactivated in the SG graph in 514. Consequently, the original graph is fully decomposed into two graphs and the number of intersections in the decomposed graphs are reduced by at least an order of magnitude in most cases. An example of the B2B paths decomposition is schematically depicted in FIGS. 7A and B, with the primary graph in FIG. 7A and the secondary graph in FIG. 7B.

Depending on the length and/or complexity of the generated tour, it may be segregated into one or more survey routes before providing the survey route(s) to the surveyor(s) as represented by 210b of FIG. 2B. For example, suitable maximum and minimum route length thresholds may be set, so that each route falls within that range. Further, another aspect of improving a survey route relates to providing an alignment phase for each route to help increase the accuracy of the PDR determination used to assign locations to each set of recorded signals for the survey. During the alignment phase, a PDR estimation of the initial heading of the device may be performed, so it may be desirable to establish a minimum distance threshold of a straight path at the beginning of each route before the first turn to ensure the alignment phase is completed. Similarly, since the signals being recorded are being correlated to positions, it is desirable for the determined positions to be as accurate as possible. Generally, these positions are determined in real-time during the surveying process. Due to the limitations associated with inertial sensors discussed above, the accumulated distance error may increase as the number of steps between turns increase. Therefore, in one aspect an improved survey route may implement a maximum distance threshold between turns. Alternatively or in addition, a route that has turns that are too close to each other may increase the difficulty of detecting the turns with PDR, so that an improved survey route may implement a minimum distance threshold between turns. Alone or together, implementing the survey route with these thresholds may result in more accurate position determinations to be correlated with the recorded signals.

As such, one technique for dividing the generated tour into multiple survey routes may involve taking the average between the minimum and maximum route length thresholds to establish the number of routes that will be provided. A shifting method may be used to reshuffle edges between initial routes to help ensure that the distance to first turn for any route is always greater than the threshold set by the alignment requirement. The resulting survey routes may then be provided to one or more surveyors to conduct the survey. As will be appreciated, a single surveyor may follow each route sequentially, or multiple surveyors may each follow one or more routes. Further, the surveyors may be humans or may be automated devices as noted above.

Accordingly, in some embodiments, aspects of this disclosure include scheduling operations to dictate parameters of the overall planning of the survey such as determining which surveyors will perform which of the provided survey routes when multiple surveyors are generating the fingerprint map for the area. Another scheduling parameter relates to specifying an order in which a plurality of survey routes may be performed by one surveyor. As will be discussed in further detail, a factor that may be involved in expediting the survey is to reduce or minimize the amount of time necessary for a surveyor to get from a current position to the start of the next route to be surveyed and the scheduling operations performed may be based, at least in part, on this factor. Thus, one function of the scheduling operations may include providing a next survey route to be traversed to a surveyor by selecting a route from a pool of survey routes that still need to be traversed.

In addition to survey routes that are based on a generated tour, but have not yet been provided to a surveyor and traversed, the pool of survey route may also include routes that have been traversed, but have been identified as having been performed insufficiently. Thus, some embodiments of this disclosure include techniques for assessing the performance of the surveyor in traversing the survey route as will be discussed in greater detail below. As an illustration, the assessment that is performed may be in-route or post-route. Based on the assessment, it may then be determined that a repeat of one or more of the survey routes of the survey may be warranted.

For example, a route that fails the in-route assessment may be signaled immediately (whether in case of human surveyor or machine surveyor), so that a failure in early stages of the route may lead to repeating the route right away in one embodiment if the surveyor is nearer to the start location of the route, while a failure in later stages of the route may result in proceeding to a next route if the surveyor is nearer to the start of that next route location of the route. In this latter case, the failed route may be rescheduled for later survey. In general as a consequence of in-route assessment, since any one surveyor may have been assigned multiple routes so that they may be performed in an optimized sequence, multiple options are possible, such as immediately repeating the current failed route, repeating the failed route at some later time during a sequence of assigned routes or repeating the failed route after a currently assigned sequence of assigned routes has been completed. As yet another possible alternative, the failed route may be assigned to a different surveyor (if multiple surveyors exist and if it is found more optimal for the other surveyor to handle that failed route).

Likewise, if the post-route assessment is performed while the surveyor is still in the field, the surveyor may also be directed to the beginning of a pending survey route based on one or more criteria, such as proximity. If a post route assessment failed for a certain route, this route will be rescheduled for another traversal. Some exemplary scheduling techniques are discussed later below. As an illustration, if another survey route to be performed by the surveyor has a closer starting point than the failed survey route, the failed route may be scheduled to be performed at a later time (such as for example to maintain an optimal strategy as per the techniques discussed below) and/or by another surveyor (if multiple surveyors exist and if it is found more optimal for the other surveyor to handle that failed route). In some embodiments, a surveyor may be assigned a sequence of routes that has been optimized so that the start of a next route begins at or near the end of the previous route. Under this conditions, it is more likely that the failed route should be performed after the sequence has been completed, but it may also be possible to reorder the sequenced routes.

Thus, the evaluation process may result in several routes that should be re-surveyed because they have either failed an in-route assessment and it was not logistically desirable to immediately traverse the route again (such as for example if this route failed in later stage of the route that was more distant from the start) or because the overall scoring of a post-route assessment was not satisfactory. Any such routes that fail assessment may be scheduled for another traversal, or "re-traversal." The scheduling of a failed route is an indication that it needs to be traversed again. The scheduling may involve coordination with the traversal of other already scheduled routes, with the traversal of other routes that have not yet been assigned, with the traversal of other failed routes or any combination of these and others. Various techniques may be employed to schedule failed routes as discussed in the discussion of scheduling below. An important constraint used during scheduling is to minimize or reduce the total re-surveying time of the failed routes, with the goal of expediting the overall survey. This may be achieved by sorting pending survey routes based on the current proximity of the surveyor to the respective starting points so that the time taken by the surveyor to get to the beginning of the next route is minimized. However, other criteria may also be employed as warranted.

Figure 8:
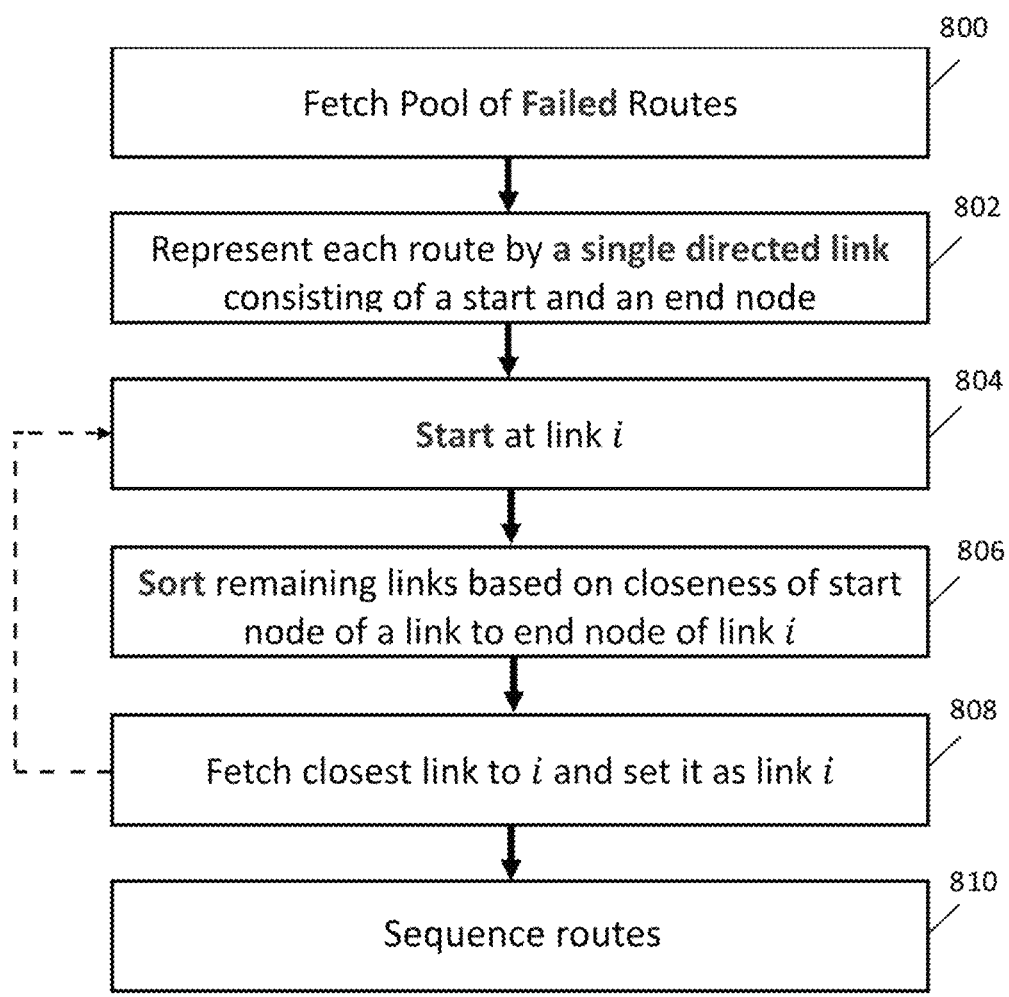
FIG. 8 is a flowchart of a routine for scheduling failed survey routes according to an embodiment.

One suitable technique involves scheduling based on a nearest neighbor criterion. An exemplary routine for performing this scheduling is schematically depicted in FIG. 8, but it will be appreciated that other routines for achieving this function are within the scope of this disclosure. Beginning with 800, the failed routes are pooled and are represented by a single directed link in 802. This link may include the start and end node of a route. Since all routes are directed, these routes should be surveyed from the start node to the end node. Starting at any link denoted i in 804, all other links may be sorted relative to the Euclidian distance between the end node of link i and the start node of the all links in 806. The closest link may then be removed from the pool of failed links in 808 and set as the next starting link i. As indicated, this process is iterated by returning to 804 until the pool of failed routes is empty. At this point, all routes will then be ordered in 810 such that the surveyor minimizes the transition period from one route to the next. Since this procedure starts at any random route and builds the sequence of routes relative to the closest route, different sequences may be generated depending on which route was randomly chosen. Moreover, at every epoch, choosing the nearest neighbor does not guarantee an overall minimization to the cost.

Therefore, a more involved technique may be employed as desired. One suitable example employs a search-based strategy that allows optimization of an objective function. Each failed route denoted by $f_i$ may be represented by a start node and an end node denoted by $f_i^s$ and $f_i^e$ respectively. The distance between $f_i^e$ and the end node of route j denoted by $d_i^{ff}$, may then be used in the formulation of the objective function. If route j is traversed after route i, then route i and route j are connected. This connection is formulated by a binary decision variable denoted by δ. If route i and route j are connected, then their connection is represented by $\delta_i^j=1$. Moreover, the inverse of the connection variable denoted by $\delta_j^i$ is equal to 0. Search-based scheduling seeks to minimize the distance walked by the surveyor when transitioning from traversing one route to the next. One exemplary objective function to achieve this goals is represented by Equation (2), but other objective functions may also be used:

$$F = \sum_{i=0}^{R-1}\left[\delta_i^j * d_i^{f_i^e}\right] \quad (2)$$

This formulation provides a cost function that may be minimized to achieve the goal of expediting the survey. Any suitable search technique may be used to find the optimal solution that minimizes F. For example, a genetic technique may be used by generating an initial population of solutions using the nearest neighbor strategy discussed above. As noted, a random link may be chosen as the starting link, which then results in a corresponding sequence of routes. By choosing a different starting link, this operation may be repeated until the number of solutions necessary to build an initial population is reached. It will be appreciated that the optimality of the solution depends on the design of the search technique. For an embodiment employing the genetic algorithm, the crossover technique and the mutation rate are the main contributors to the speed of convergence to an optimal or near-optimal sequence of routes. However, in other embodiments, different search strategies may be employed as desired. Likewise, other overall procedures for scheduling survey route may be used with the techniques of this disclosure.

Figure 9:
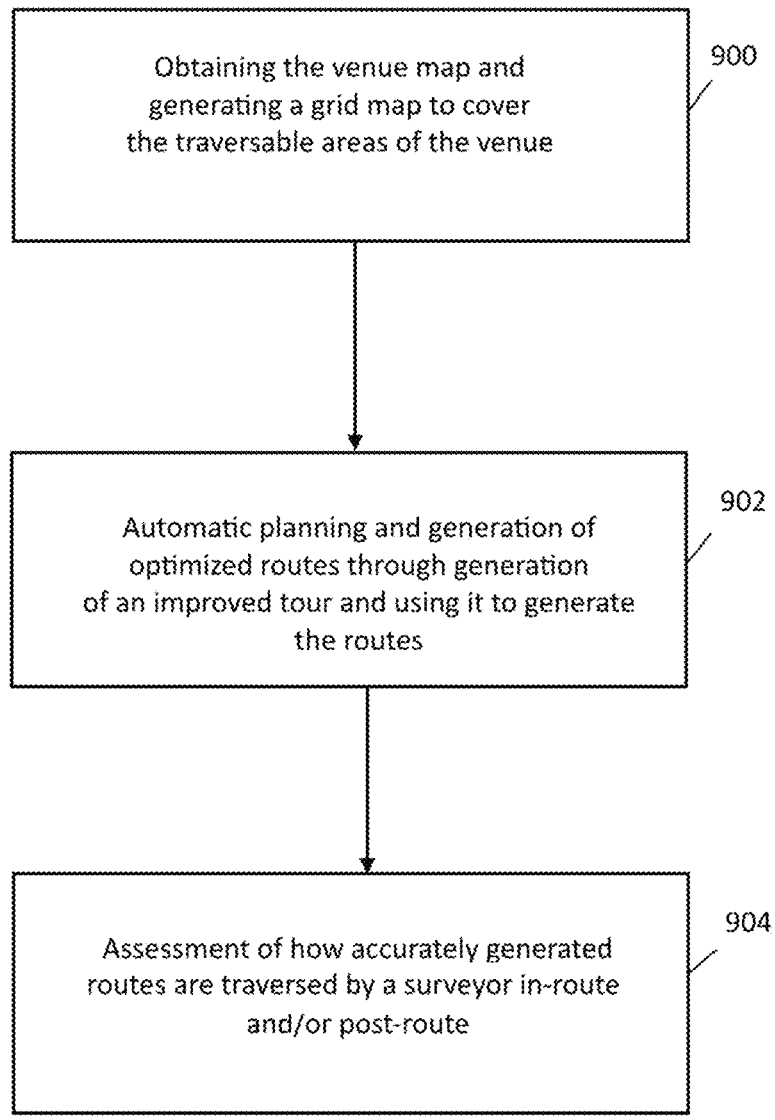
FIG. 9 is a flowchart representing an overall view of a method of this disclosure, according to an embodiment.

To schematically represent aspects of this disclosure, FIG. 9 depicts an overview of the operations that may be involved. Notably, 900 represents operations associated with obtaining the information for the venue to be surveyed and generating a grid map that corresponds to the traversable regions. Next, 902 includes the operations associated with automatically planning and generating the optimized survey route(s) through using an improved/optimized tour. The tour is used to generate the routes, for example the tour may be divided into more than one route depending on characteristics of the grid map. As discussed above, the routes from the tour generated by the techniques of this disclosure are improved based on criteria such as expediting the survey to save time and resources, giving strong guidance to surveyors, assuring a more complete and more accurate survey and enhancing the usability of the routes, such that they may be performed by untrained surveyors. Finally, 904 relates to operations regarding assessment that evaluates the degree to which a given route is accurately performed by the surveyor, and this evaluation may be performed in-route while the route is being traversed and/or may be performed post-route, such that the overall quality is evaluated. Depending on the assessment, a route may be scheduled for another traversal as noted above or, when performed in-route, a route may be discontinued if the errors are sufficient.

As indicated by 904 of FIG. 9, the performance of the surveyor in executing the survey route may be assessed. The following discussion explains that the assessment may be in real-time as the survey is being conducted (in-route assessment) and/or at a subsequent time (post-route assessment). After the tour has been generated and the one or more survey routes have been provided to the surveyor(s), each survey route may be traversed to record the signals and construct the fingerprint map.

The assessment may be performed by comparing the actual path taken by the surveyor, as may be determined by PDR, another dead reckoning technique, or any other suitable method, to a reference trajectory that corresponds to the provided survey route to allow determination of whether the surveying of each route was sufficiently successful. Evaluation of the traversed routes may be in real-time (in-route) to allow for adjustments and/or repetition of certain portions of the survey route. Alternatively or in addition, an offline scoring process may be performed after completion of the survey route (post-route) so that an appropriate confidence may be assigned to the measurements recorded during that route and/or to determine whether all or a portion of the route should be repeated. Using the offline, post-route scoring process, an overall score for each completed traversed route may be computed. The following materials describe representative techniques for in-route and post-route assessment, but they are provided as illustrations only and should not be considered limiting.

Notably, an in-route assessment technique may be performed to compare the navigation solutions determined for device 100 as a survey route is being traversed in real-time with the intended route used as reference. The navigation solutions may be derived from the inertial sensor information and any other suitable information as desired using PDR as noted above. The navigation solutions may be used to track the position and direction of the surveyor to evaluate the degree to which the actual route traversed matches the survey route provided from the generated tour. The matching may involve distance, turn angle value, and/or turn direction. As warranted, a set of benchmark points may be used to identify the comparison check times. The turn points in the navigation solution trajectory may be used to represent the benchmark points, as well as the start point of the trajectory. The in-route assessment may be performed in the real-time during as the survey is conducted. For embodiments in which device 100 is associated with a human surveyor, feedback from the in-route assessment may be provided to the surveyor so that any necessary corrections to the trajectory may be made or the ongoing traversal of the provided survey route may be discontinued (and then optionally scheduled for another traversal as discussed in further detail below) as warranted. Such feedback may be provided through a graphical user interface on device 100 or in any other suitable manner.

Figure 10:
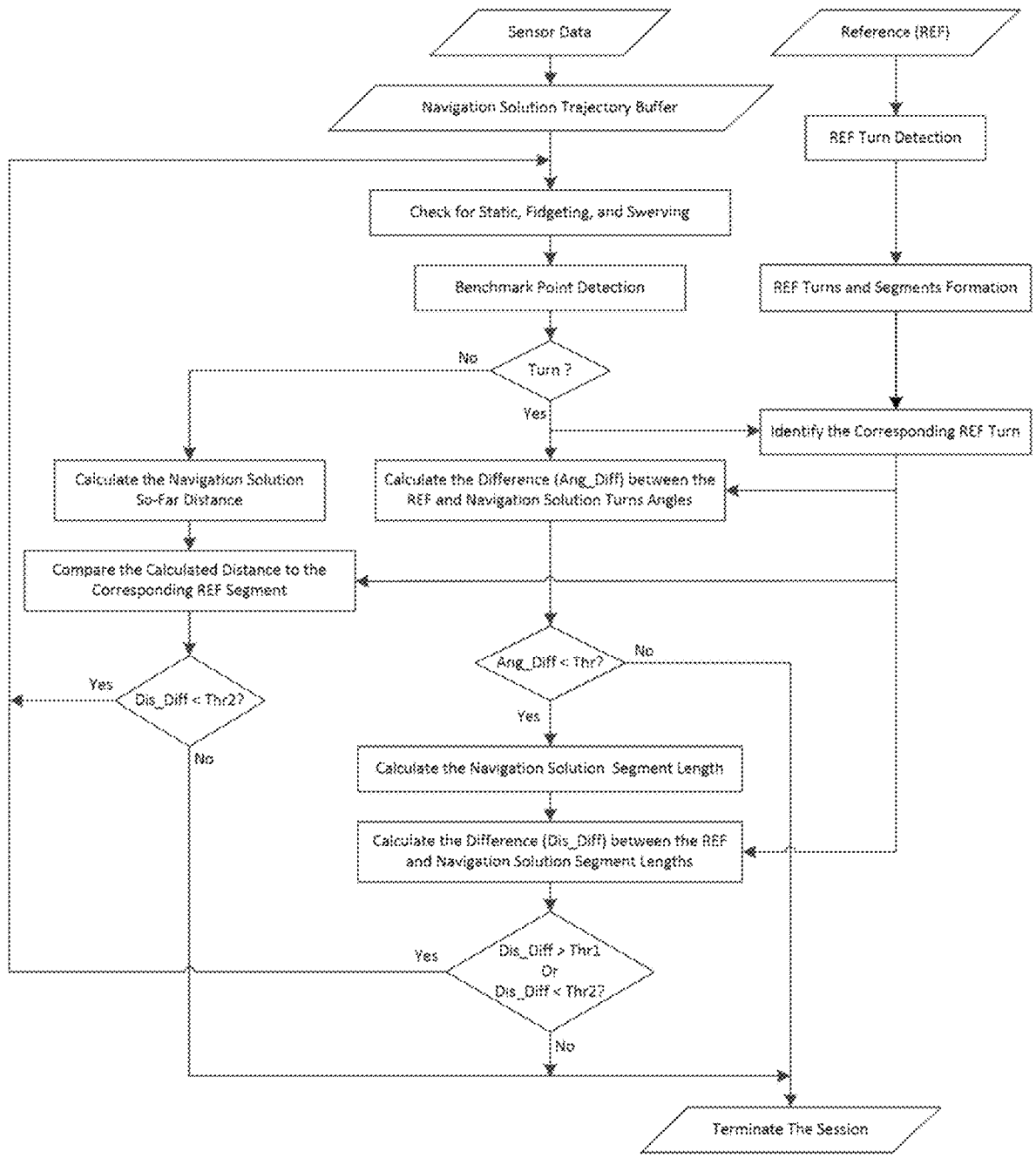
FIG. 10 is a flowchart of a routine for performing an in-route assessment of a survey route according to an embodiment.

As noted, exemplary criteria that may be used to evaluate the degree of matching between the navigation solution trajectory and the survey route include a "So-Far" distance traveled since the last benchmark point, the difference between the corresponding turn angles values in the navigation solution trajectory and the reference trajectory, and the difference between the lengths of corresponding segments of the navigation solution trajectory and the reference trajectory. A representative routine for employing this information to perform in-route assessment of the survey route is schematically depicted in FIG. 10. As indicated, a reference trajectory corresponding to the survey route provided to the surveyor is processed with a turn detection technique and used to form the reference trajectory segments. In parallel, the sensor data for device 100 and is processed, such as by navigation module 120 to derive and buffer navigation solutions for the actual trajectory of the surveyor. At each epoch, the technique checks for conditions when device 100 is static or when the surveyor may be fidgeting with device 100 so that even though motion is detected, that motion does not represent movement along the trajectory. Another condition that may be detected is swerving, which corresponds to an unstable interval during which the surveyor gradually deviated from the intended route so that the heading change is not abrupt. Identifying these intervals may help to recognize a true detected turn from such a swerve for more accurate determination of turns or segment length.

Once a turn is detected, the corresponding turn in the reference trajectory is identified and located to match the corresponding turn and segment from the reference trajectory. The identified parameters in the reference are used for comparison with corresponding terms in the ongoing processed navigation solution trajectory. Two main parameters that may be compared to determine whether the surveyor is following or not following the provided reference path are i) turn angle value and direction, and ii) the segment length. The corresponding turns may be compared in terms of the turn angle value and the direction of the turn whether it is to the right or left, while the segments are compared in terms of the segment length. When the corresponding turns are matched in direction, the difference between the two angles values may be calculated and compared to an angle threshold. If the angle difference is within the predefined angle threshold, then the difference between the segment lengths is calculated and compared to distance thresholds, Thr1 and Thr2 to check on "very short" segments and "very long" segments respectively. The terms very shot and very long are relative to the length of the navigation solution segment and the reference segment. Thus, this routine represents three conditions to be satisfied when a turn is detected in order to continue the session, such that if any one is not met, the session may be discontinued: matched turn direction, angle difference less than the angle threshold, and segment length difference between Thr1 and Thr2. When no turn is detected, the routine calculates the accumulated distance from the last benchmarked point to the current epoch using an estimated step length of the surveyor, with the accumulated distance being the so-far distance noted above. The so-far distance of the navigation solution trajectory may then be compared to the length of the corresponding segment. The session continues if the so-far distance is less than Thr2, otherwise the session terminates.

For embodiments that incorporate a post-route assessment, the overall trajectory followed by the surveyor is considered after completion and compared to the reference of the provided survey route. As one non-limiting example of a suitable post-route assessment, a scoring technique may be performed to measure the degree to which the surveyor was able to follow the intended route. The following materials describe a technique for providing a score that represents the degree of similarity between the navigation solution trajectory and the survey route as expressed by percentage. The provided score indicates whether the surveyor followed the provided reference path or not. The degree of similarity, i.e., score, varies from 0% to 100%. Correspondingly, the calculated score gives insight about how closely the surveyor followed the survey route when recording the signals to be used for constructing the fingerprint map.

In this embodiment, two main sub-scores may contribute to the final score, turn-based score and segment-based score, so that the final score relates to how the surveyor is following a provided route and instructions. The contribution of each score to the final score may be equal or based on a certain ratio for each score as desired, with the total ratio of contribution summing to 100% at the end. The turn-based score may be configured to measure the similarity between the turns of the navigation solution trajectory and the reference trajectory based on the turn angle and direction. The turn-based score may be calculated based on the difference between the navigation solution turn angle and the corresponding reference turn angle. The segment-based score may be configured to measure the similarity between the segments in the navigation solution trajectory and the reference trajectory based on the segment length. The ratio of the length difference between the navigation solution segments and the corresponding reference segments may be used to calculate the segment-based score. Segment straightness is another factor that may be used when calculating the segment-based score. In either or both cases, the turn-based score and the segment-based score may also depend on the sequence of angles and lengths in addition to the similarity between given turns or segments. A more representative score may be calculated when considering the matched turns in terms of angle difference and turn sequence and/or when considering the matched segments in terms of length difference and the sequence of occurrence.

Figure 11:
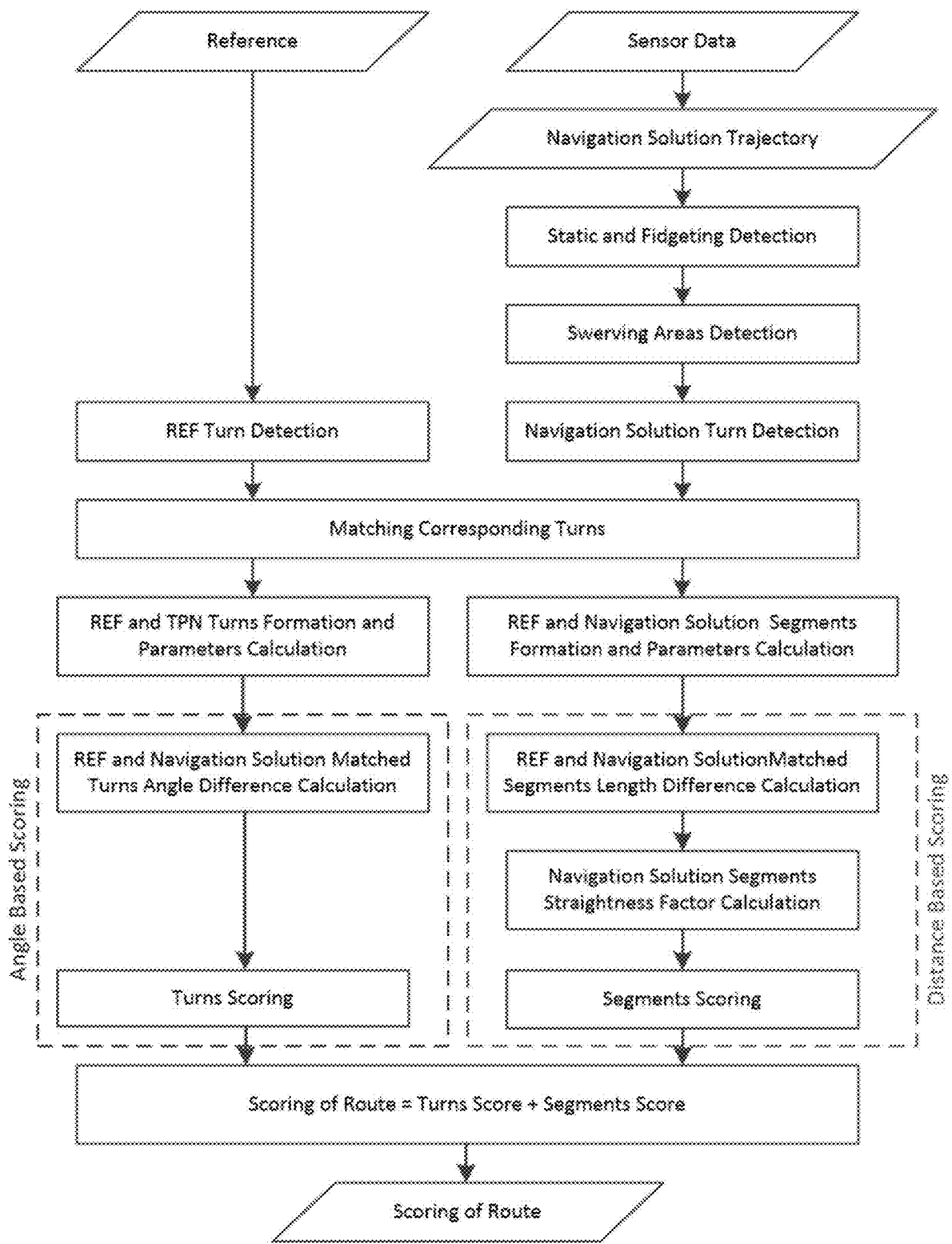
FIG. 11 is a flowchart of a routine for performing an post-route assessment of a survey route according to an embodiment.
Figure 12:
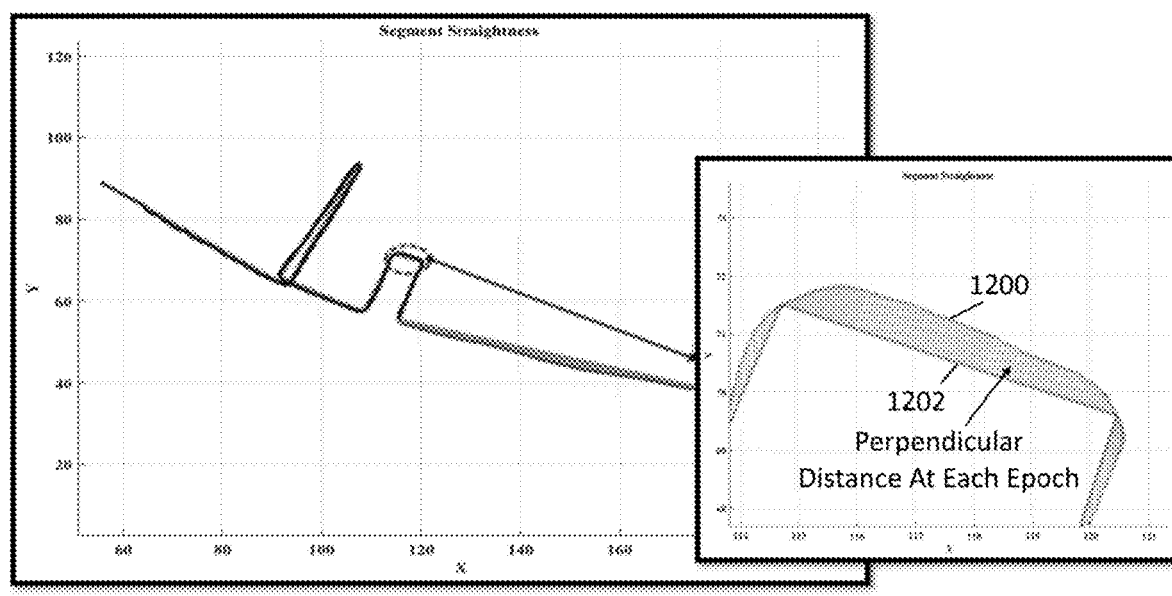
FIG. 12 is a schematic representation of determining a straightness factor when performing a post-route assessment according to an embodiment.

An exemplary routine that may be employed for post-route scoring is schematically depicted in FIG. 11. Initially, the inertial sensor data from device 100, along with other information as desired, may be used to derive navigation solutions to develop the navigation solution trajectory to be compared to the survey route in a similar manner to the in-route assessment discussed above. As described, this may include detecting static, fidgeting and/or swerving. The navigation solution turns and the reference turns may be used to evaluate the similarity between both routes. Generally, both trajectories may be defined by a path, Start point, and End point. A turn detection technique based on heading change may be used to detect the route turns, under the assumption that change in heading is expected to be higher at turns than during straight segments. Using predefined thresholds, the technique may identify the points at which turns occur. Alternatively or in addition, turn detection may be performed using a technique that considers change in position, such that abrupt changes in position may identify turn locations. As desired, a checking procedure may be used to remove any unwanted miss-detected turns in the navigation solution trajectory. For example, fidgeting or inappropriate action of the surveyor during the survey may result in a mistaken turn identification. Correspondingly, these miss-detected turns may occur during the static, fidgeting or unstable intervals. One suitable technique for recognizing miss-detected turns may be based on the heading before and after an identified interval to determine if the surveyor underwent a change in the direction of motion or not.

Following turn detection, parameters regarding the navigation solution trajectory and the reference trajectory may be calculated as indicated. One suitable parameter is turn angle, which may be calculated as the difference between the direction of the adjacent segments bracketing each turn. Another parameter is turn direction, which may be calculated based on the turn angle sign to determine if the surveyor is turning to the left or to the right. Identification of a U-turn is also a parameter that may be employed in the scoring routine. Yet another parameter may be the time taken to complete a given turn. In other embodiments, additional parameters may be used in conjunction with or in place of these parameters as desired. The noted parameters may then be used to match turns between the navigation solution trajectory and the reference trajectory. It will be appreciated that the number of turns of each trajectory may or may not be equal, as a turn for one trajectory may not be assigned to a turn of the other trajectory when there is insufficient similarity between their parameters. Turn matching may involve comparing turn angle and direction as the main parameters to identify pairs of turns between the trajectories. Next, the sequence of turn direction may be used to improve the correct assignment of turns. The routine may check the previous turn direction and the next turn direction to find the correct sequence. In some cases, the distances to the previous and the next turns may also be used to identify a unique turn to be matched in situations where a repeated sequence might otherwise cause confusion.

Next, navigation solution and reference trajectory segments may be formed based on the matched turns. Each segment in either trajectory may be defined as a direct link between two consecutive turns, from Start point to the first turn, or from the last turn to the End point. As with turns, each segment may have any suitable number of calculated parameters such as segment length, segment start time, and segment end time.

As indicated, the segment-based scoring branch of the routine may involve calculating the difference between the length of each reference segment and the corresponding navigation solution segment. Further, when the surveyor moves in a direct path from one turn to another turn this leads to a segment having a shape of almost a straight line. However, when the surveyor maneuvered around an obstacle, for example, there may be a bump or other perturbation in the trajectory. The area under such deviations may be calculated to obtain a straightness factor for the segment as indicated. The straightness factor may be calculated using the perpendicular distance from each point on the route belonging to the deviation to a straight line between the turns defining the segment. One exemplary equation that may be used is given in Equation (1), wherein N represents the number of points (epochs) per segment:

$$\text{Straightness factor} = \frac{1}{N}\sum_{i=1}^{N}(\text{Perpendicular Distance}) \qquad (1)$$

An exemplary illustration of this calculation is schematically depicted in FIG. 11. As shown, the straightness factors relates to the area defined between the navigation solution trajectory 1100 and the segment line connecting adjacent turns 1102 as measured by considering the perpendicular distance from the segment line to the trajectory. Thus, for each segment, the value of this may be calculated based on the ratio of the length difference to the reference segment length, so that a high ratio corresponds to a low score and vice versa. Also, the score for each segment may then be weighted based on the determined straightness factor. Following calculation of the score for each segment, the total segment score may be determined as the average value of the individual scores.

The other branch of the routine corresponds to the turn-based score as indicated. This score may be calculated based on the difference value between the navigation solution turn angle and the reference turn angle. A relatively high difference value indicates that the surveyor made the turn in different manner than intended by the survey route and corresponds to a lower turn score. Conversely, a relatively small difference value indicates the turn of the navigation solution trajectory was performed in accordance with the survey route and corresponds to a higher turn score. The total turns score may be calculated as the average score of the individual turns scores.

The final score provided by this routine may be a summation of the turn-based score and the segment-based score, and may be expressed as a percentage scaled from 0% to 100% or in any other suitable manner. In some embodiments, the final score may be adjusted by subtracting a penalty for missed or unmatched turns. The effect may vary based on the nature of such missed. For example, each missed turn may be identified as an intended turn of the survey route that was missed by the surveyor as the route was traversed or may be identified as corresponding to a swerve in the trajectory. The effect of a missed intended turn may be weighted more heavily than a missed turn resulting from a swerve. As will be appreciated, missing an intended turn may indicate the surveyor did not follow the survey route properly. Possible causes include ignoring the turn, performing an extra turn when the surveyor traversed the route, or performed a wrong turn when the surveyor traversed the route. The penalty associated with the missed turn may also depend on the value of its angle. For example, when the angle is very wide there is a probability that the turn detection technique did not properly identify the turn.

To help illustrate the scoring techniques discussed above, representative tests were conducted to demonstrate the performance of the scoring routine in relation to the degree to which the surveyor followed the survey route. Five different scenarios are discussed below demonstrating perfectly matched routes, routes with missed turns, and routes with wrong distances.

Figure 13:
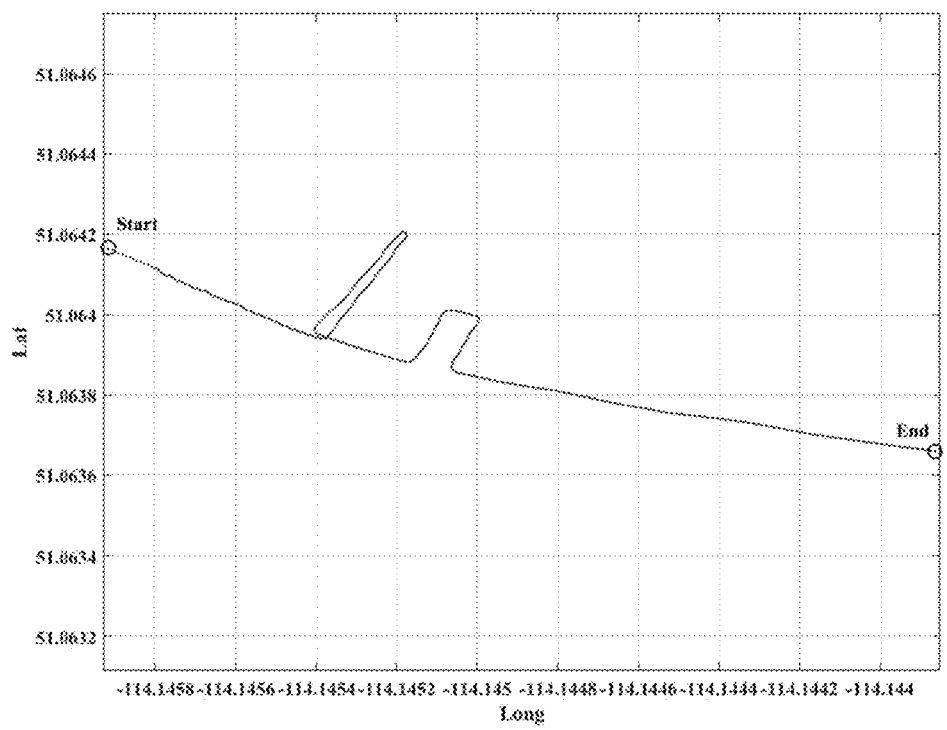
FIG. 13 is a schematic representation of the navigation solution trajectory for Scenario 1 according to an embodiment.
Figure 14:
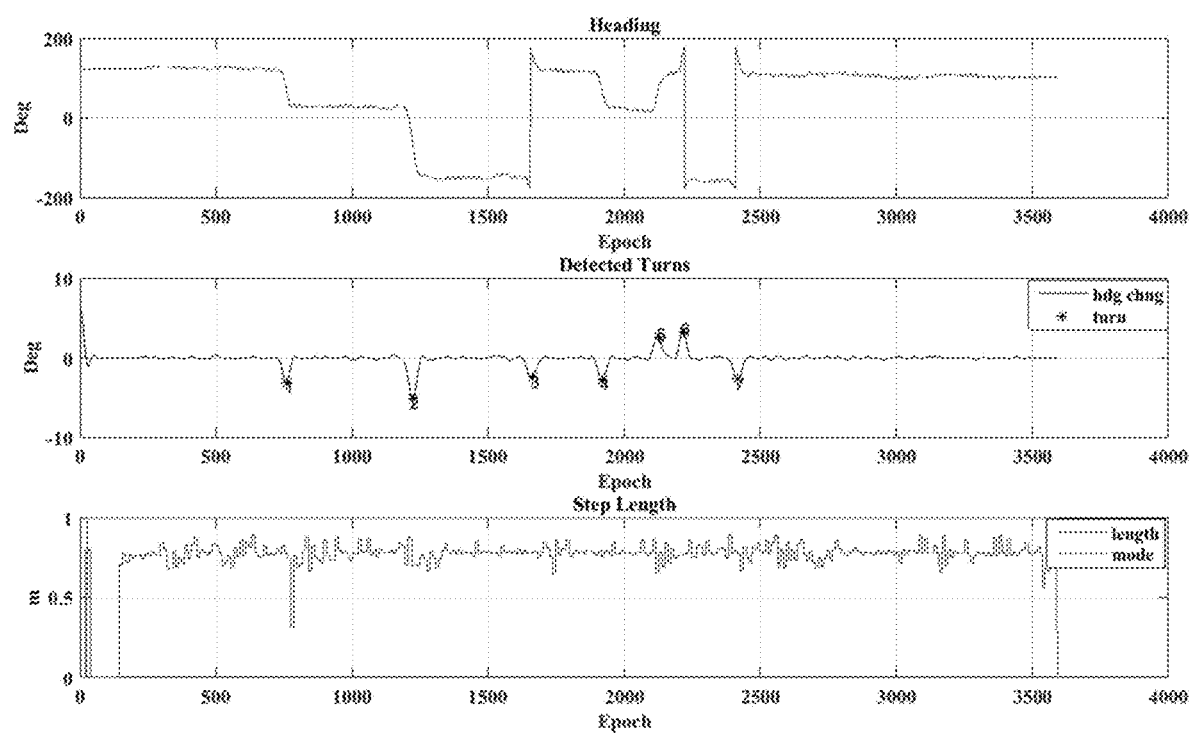
FIG. 14 is a schematic representation of information used for turn detection and matching of the navigation solution trajectory for Scenario 1, with the top graph showing heading, the middle graph showing turn detection and the bottom graph showing step length estimation, according to an embodiment.
Figure 15:
FIG. 15 is a schematic representation comparing the navigation solution and reference trajectories for Scenario 1 according to an embodiment.

In Scenario 1, the surveyor followed the survey route correctly, with FIG. 13 graphically depicting the navigation solution trajectory as determined. Three graphs are then depicted in FIG. 14, with the top graph showing the heading values over the course of the trajectory, the middle graph showing the corresponding detection of turns and the bottom graph showing the step length estimation used to determine the segment lengths. A comparison of the navigation solution trajectory, represented as an outline trace, and the reference trajectory, represented as black trace, with the numbered detected turns and the start and end of each trajectory labeled in FIG. 15. In this depiction, the reference trajectory overlays the navigation solution trajectory, obscuring it for portions that overlap. The adjoining table shows the matching of the turns by turn number. Following the techniques of this disclosure, the score in this scenario was estimated as 95.63%.

Figure 16:
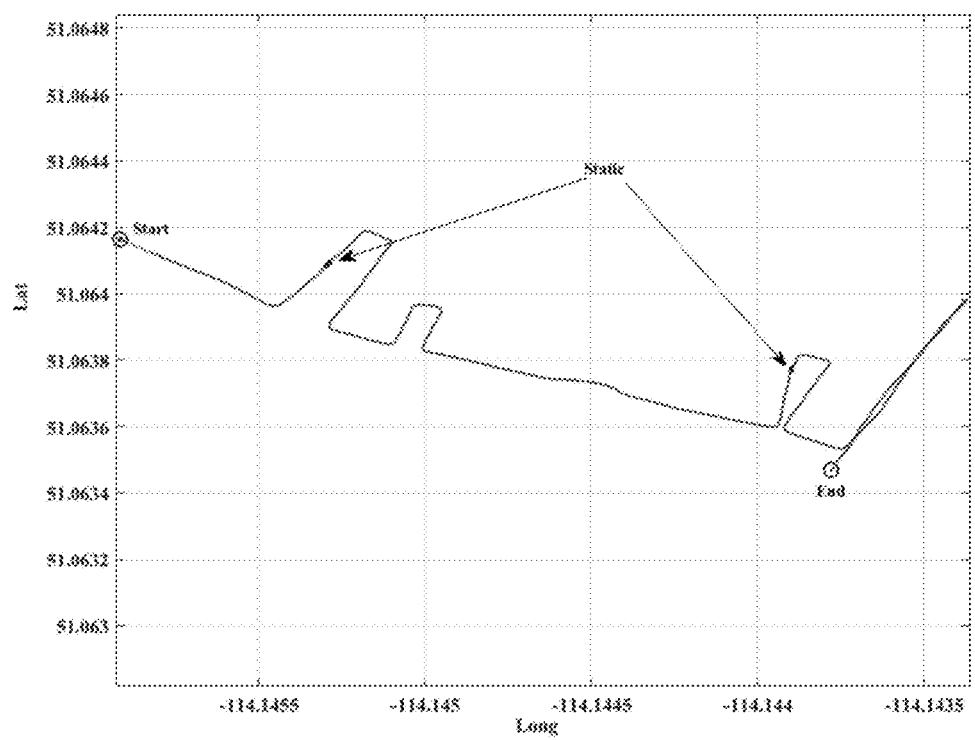
FIG. 16 is a schematic representation of the navigation solution trajectory for Scenario 2 according to an embodiment.
Figure 17:
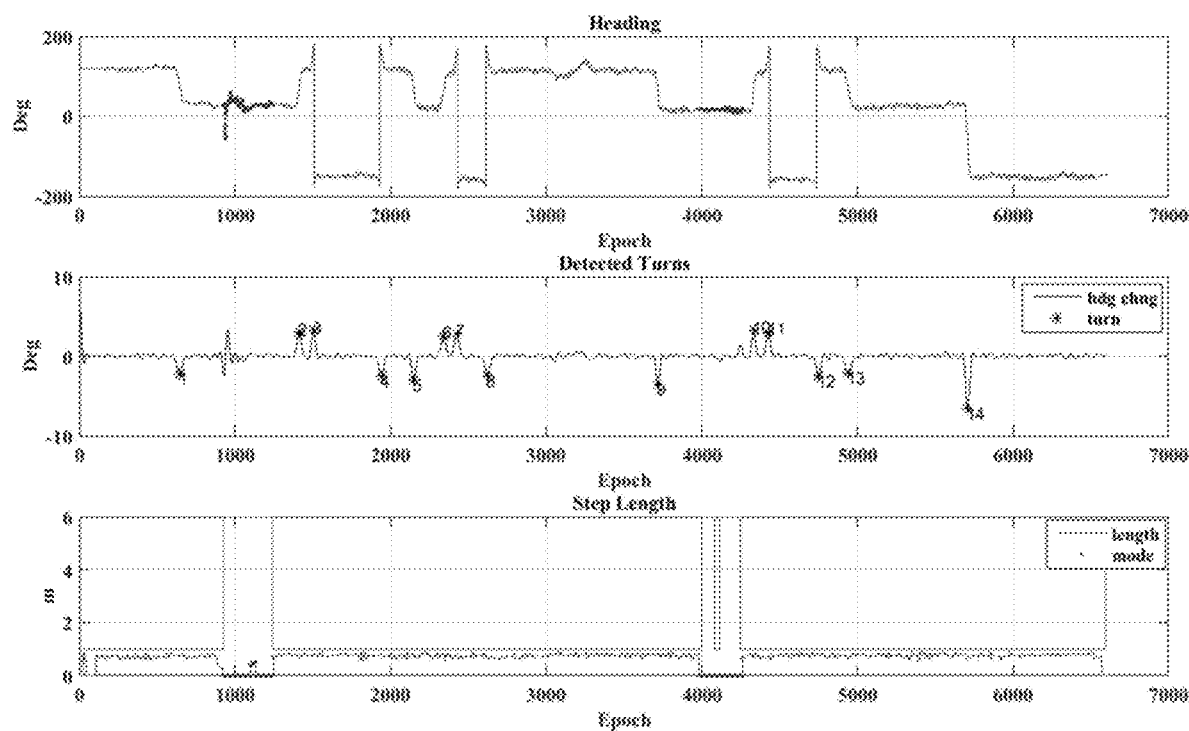
FIG. 17 is a schematic representation of information used for turn detection and matching of the navigation solution trajectory for Scenario 2, with the top graph showing heading, the middle graph showing turn detection and the bottom graph showing step length estimation, according to an embodiment.
Figure 18:
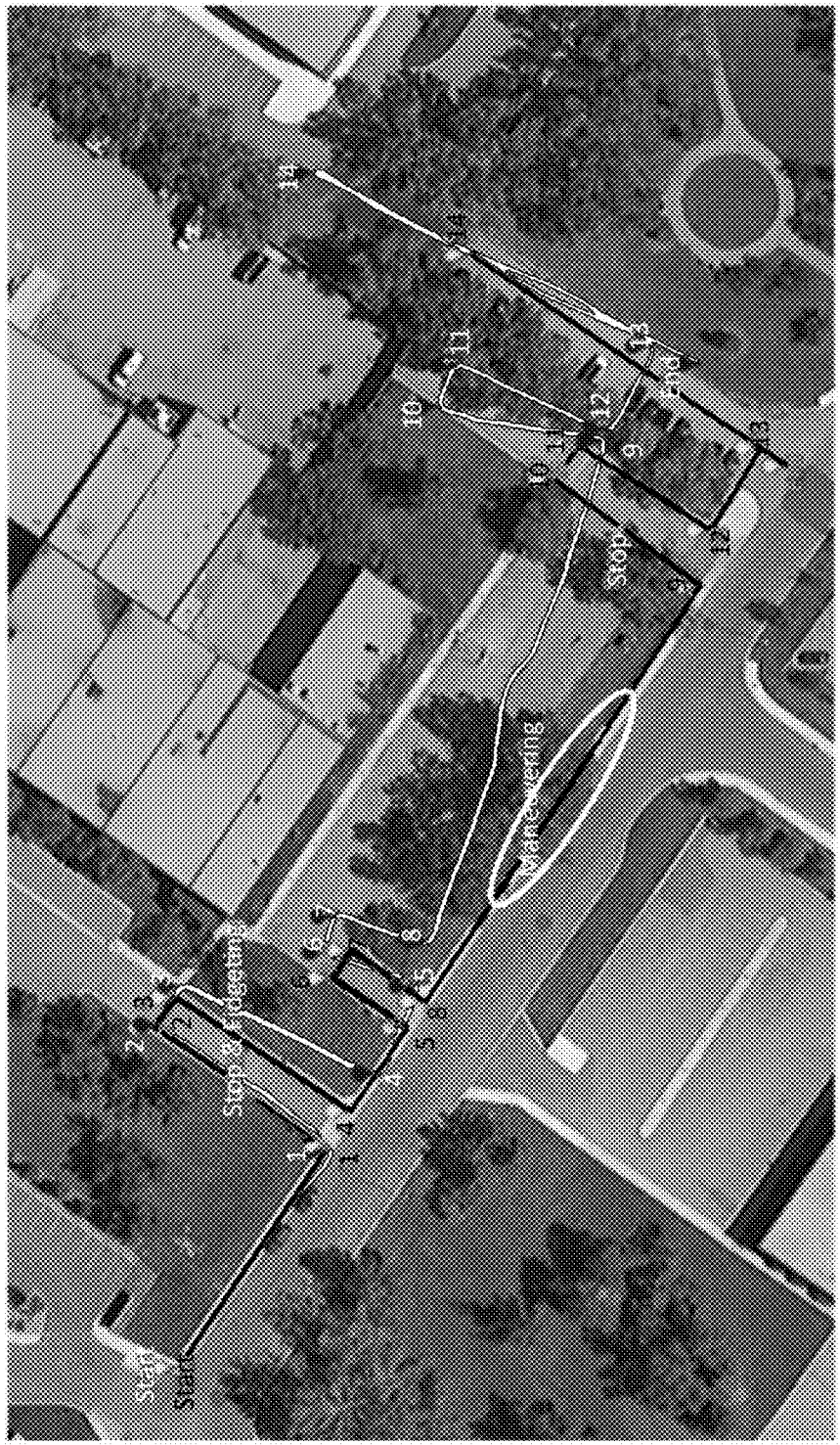
FIG. 18 is a schematic representation comparing the navigation solution and reference trajectories for Scenario 2 according to an embodiment.
Figure 19:
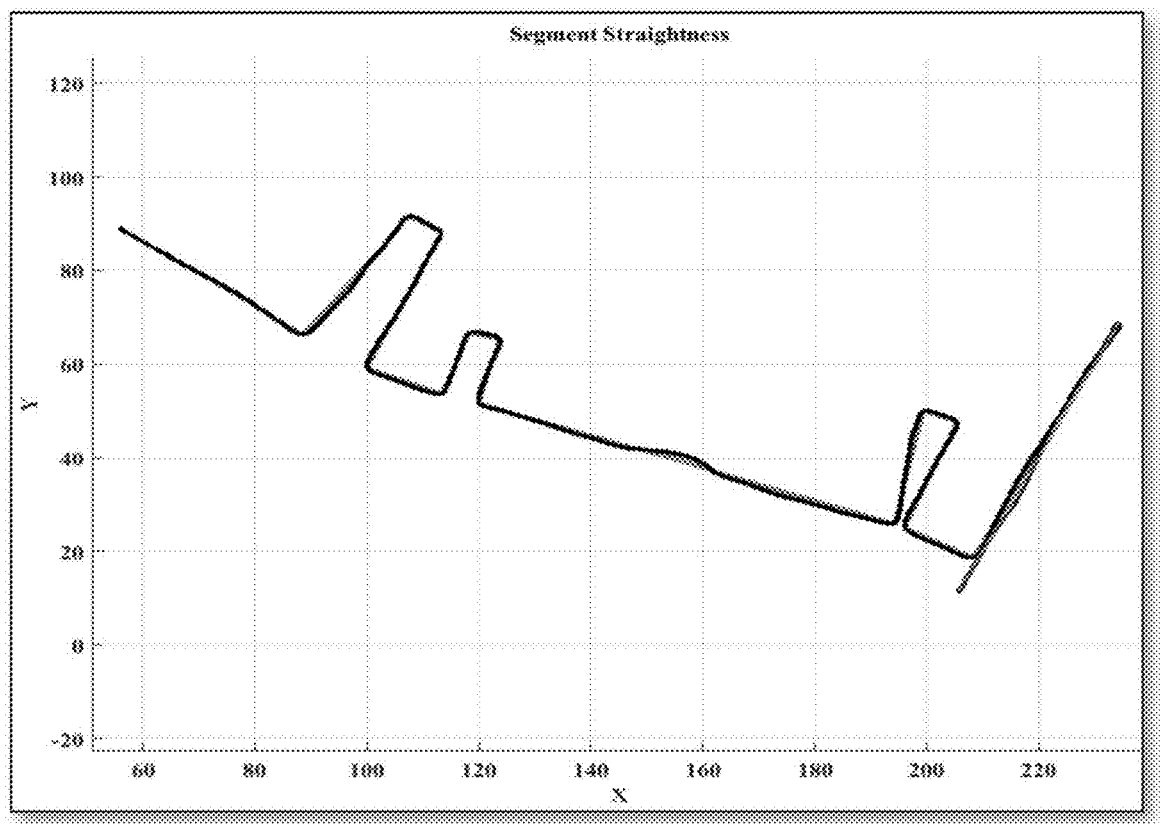
FIG. 19 is a schematic representation of determining a straightness factor for Scenario 2 according to an embodiment.

In Scenario 2, the surveyor followed the reference route correctly and stopped twice during the test. These static intervals were detected and are shown in the figures. Here, FIG. 16 graphically depicts the navigation solution trajectory as determined. The three graphs of FIG. 17 show the heading values over the course of the trajectory in the top graph, the corresponding detection of turns in the middle graph and the step length estimation in the bottom graph. The static periods in these graphs are represented in bold. Next, FIG. 18 schematically depicts the comparison of the navigation solution trajectory, represented as an outline trace, and the reference trajectory, represented as black trace, with the numbered detected turns and the start and end of each trajectory labeled. In this depiction, the reference trajectory overlays the navigation solution trajectory, obscuring it for portions that overlap. Further, the portions of the reference trajectory during which the surveyor stopped, fidgeted or maneuvered around an obstacle are indicated. The adjoining table shows the matching of the turns by turn number. Finally, FIG. 19 schematically depicts the determination of the straightness factor used for scoring. Following the techniques of this disclosure, the score in this scenario was estimated as 98.62%.

Figure 20:
FIG. 20 is a schematic representation comparing the navigation solution and reference trajectories for Scenario 3 according to an embodiment.

In Scenario 3, the surveyor again followed the survey route correctly, but some distances associated with the trajectory segments were incorrect. Thus, FIG. 20 compares the navigation solution trajectory, represented as an outline trace, and the reference trajectory, represented as black trace, with the numbered detected turns and the start and end of each trajectory labeled. In this depiction, the reference trajectory overlays the navigation solution trajectory, obscuring it for portions that overlap. The adjoining table shows the matching of the turns by turn number. Following the techniques of this disclosure, the score in this scenario was estimated as 49.5%.

Figure 21:
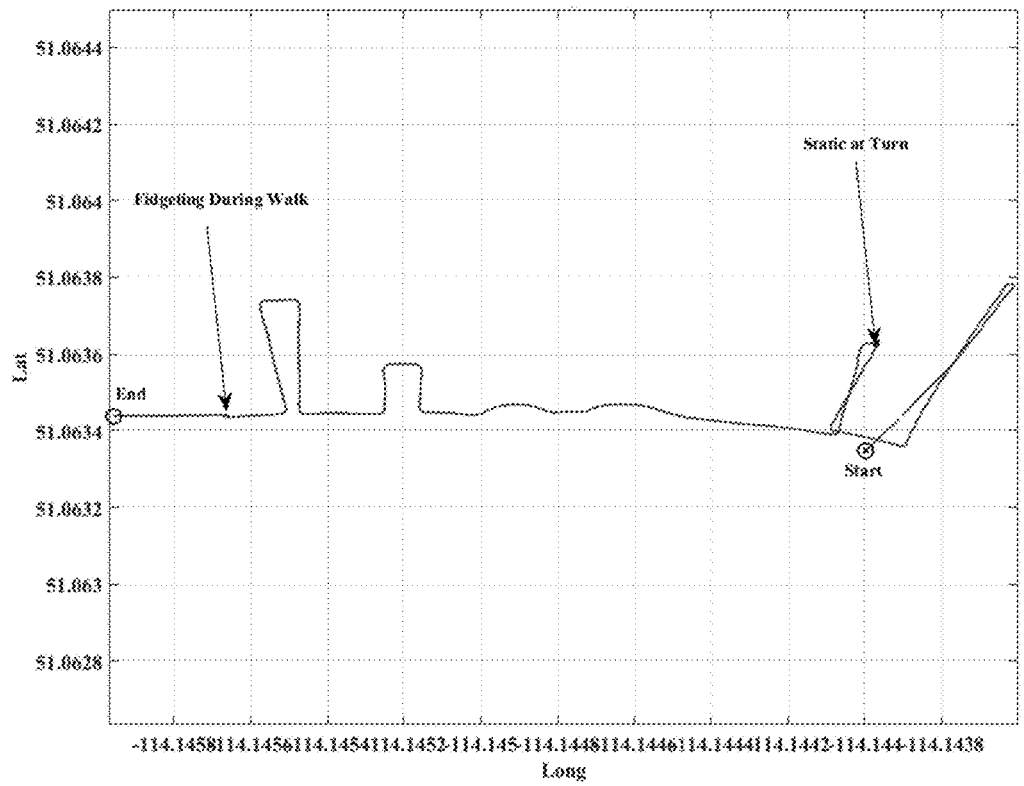
FIG. 21 is a schematic representation of the navigation solution trajectory for Scenario 4 according to an embodiment.
Figure 22:
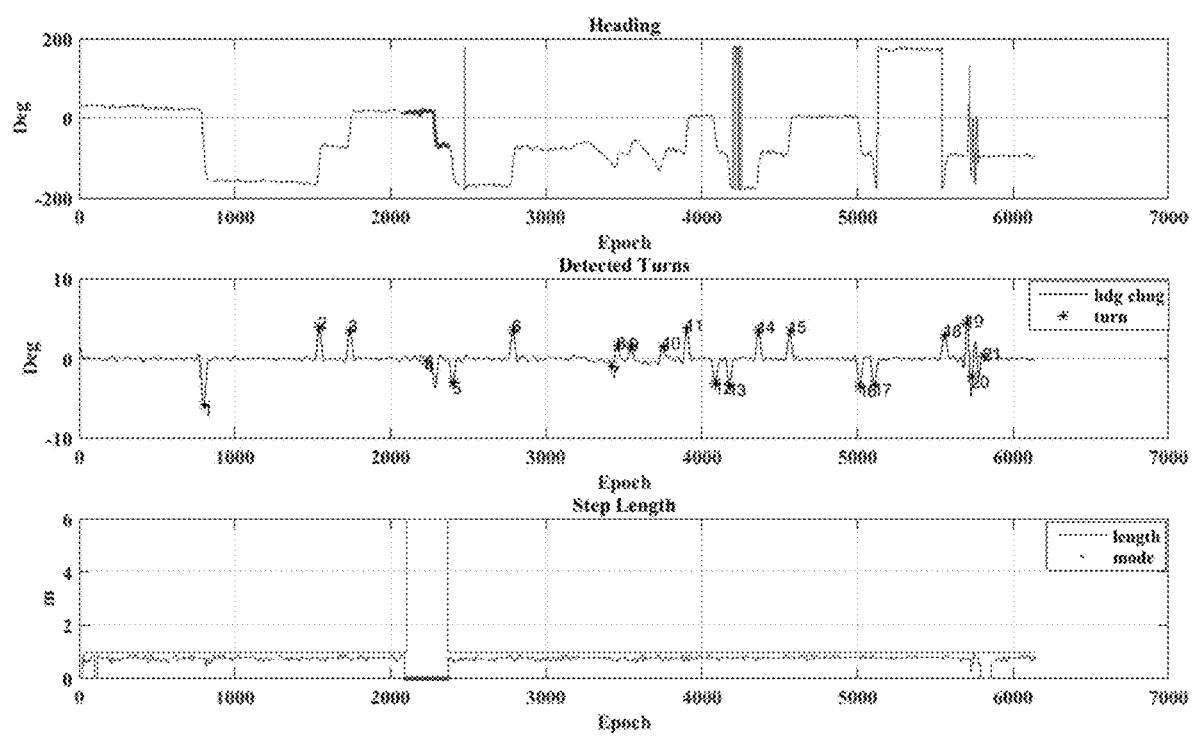
FIG. 22 is a schematic representation of information used for turn detection and matching of the navigation solution trajectory for Scenario 4, with the top graph showing heading, the middle graph showing turn detection and the bottom graph showing step length estimation, according to an embodiment.
Figure 23:
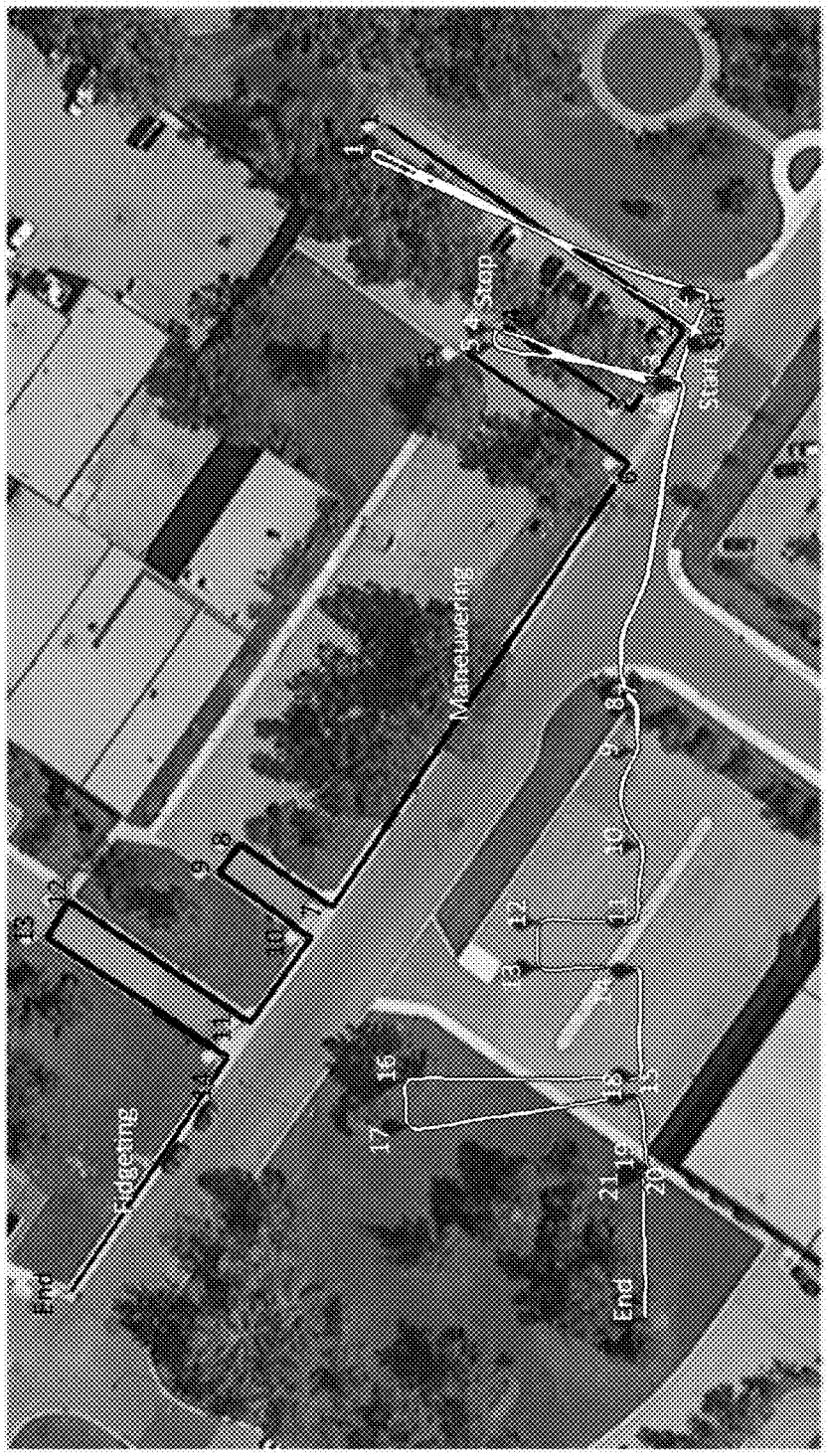
FIG. 23 is a schematic representation comparing the navigation solution and reference trajectories for Scenario 4 according to an embodiment.
Figure 24:
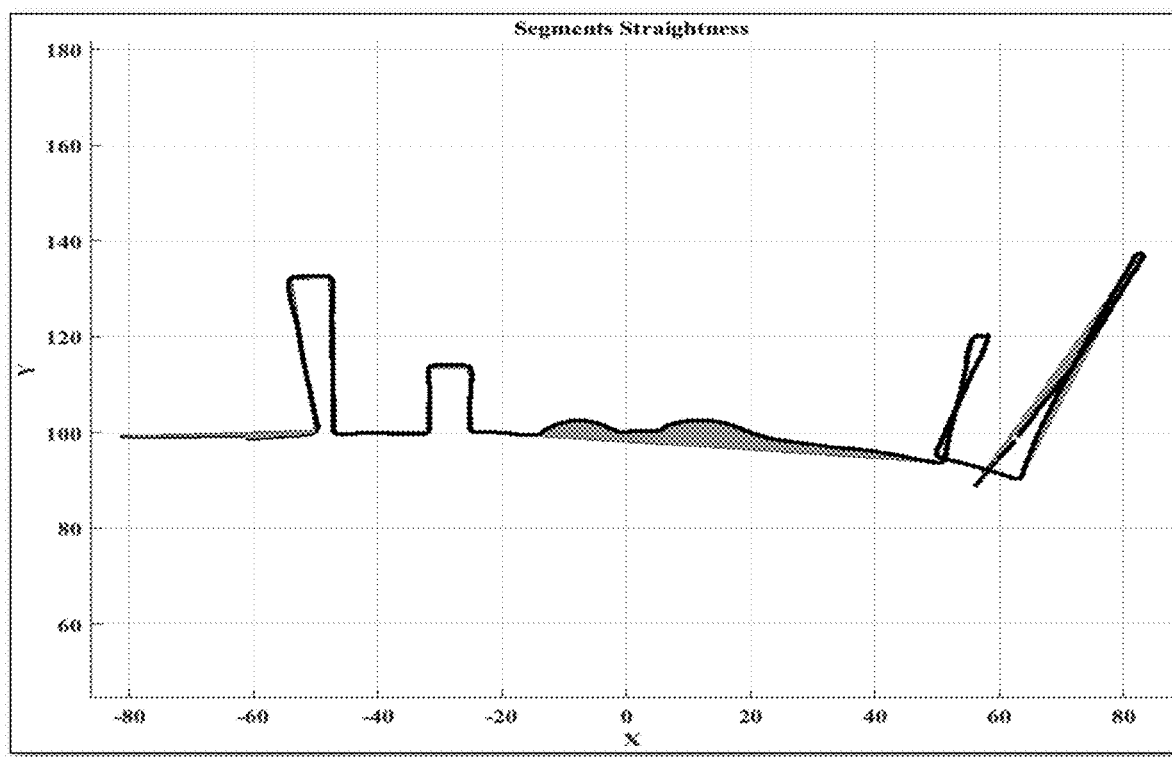
FIG. 24 is a schematic representation of determining a straightness factor for Scenario 4 according to an embodiment.

In Scenario 4, the surveyor followed the reference route correctly, static and fidgeting intervals. These intervals were detected and are shown in the figures. Here, FIG. 21 graphically depicts the navigation solution trajectory as determined. The three graphs of FIG. 22 show the heading values over the course of the trajectory in the top graph, the corresponding detection of turns in the middle graph and the step length estimation in the bottom graph. The fidgeting interval in these graphs is represented in bold. Next, FIG. 23 schematically depicts the comparison of the navigation solution trajectory, represented as an outline trace, and the reference trajectory, represented as black trace, with the numbered detected turns and the start and end of each trajectory labeled. In this depiction, the navigation solution trajectory overlays the reference trajectory, obscuring it for portions that overlap. Further, the portions of the reference trajectory during which the surveyor stopped, fidgeted or maneuvered around an obstacle are indicated. The adjoining table shows the matching of the turns by turn number. Finally, FIG. 24 schematically depicts the determination of the straightness factor used for scoring. Following the techniques of this disclosure, the score in this scenario was estimated as 77.46%.

Figure 25:
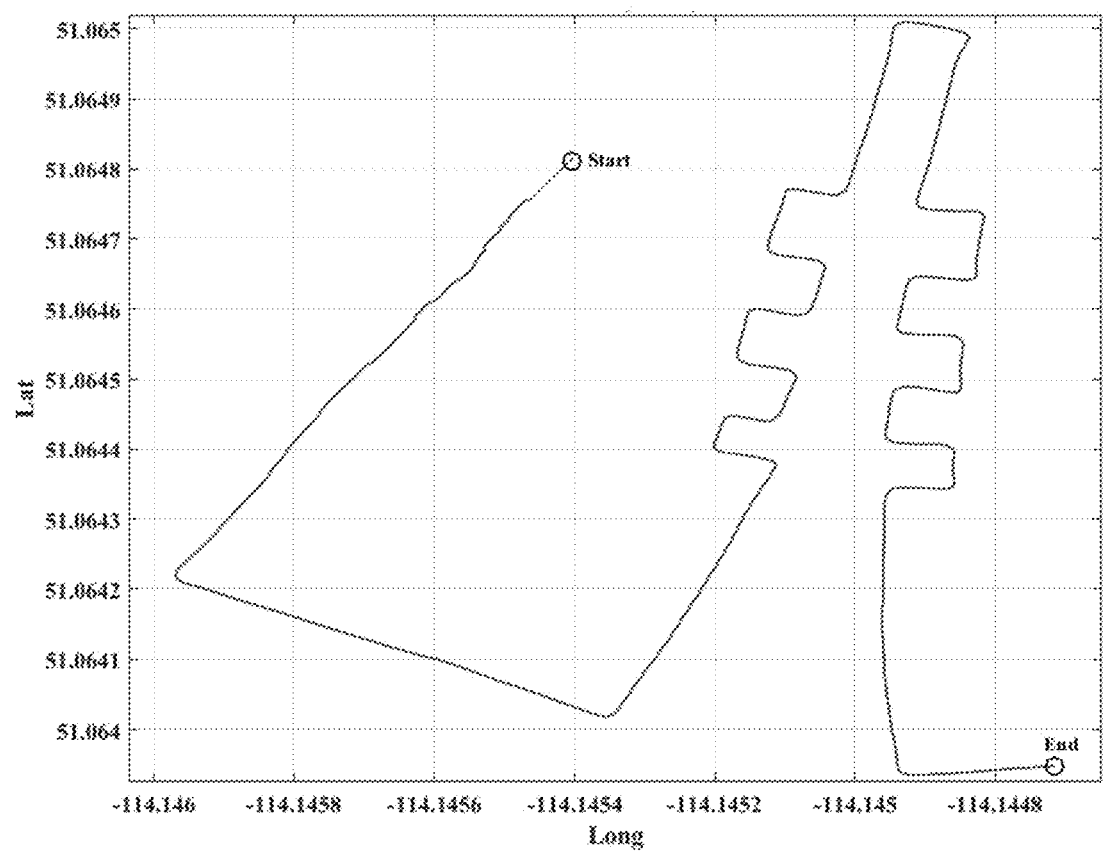
FIG. 25 is a schematic representation of the navigation solution trajectory for Scenario 5 according to an embodiment.
Figure 26:
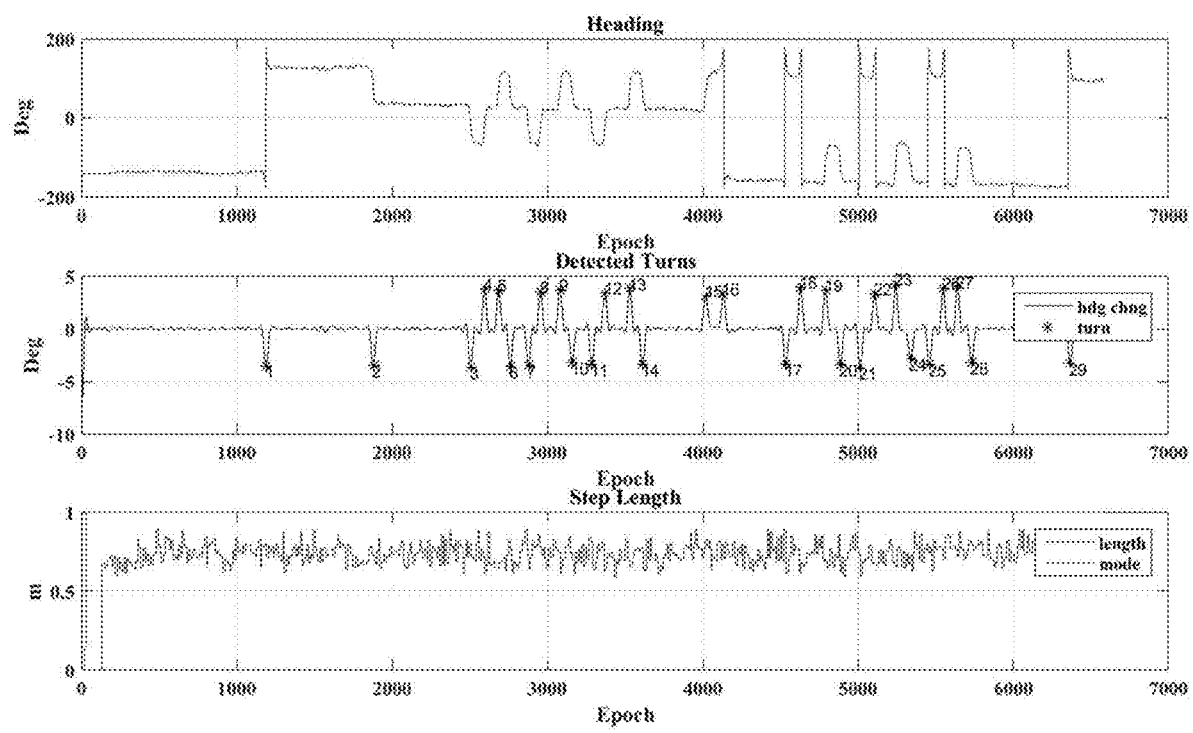
FIG. 26 is a schematic representation of information used for turn detection and matching of the navigation solution trajectory for Scenario 5, with the top graph showing heading, the middle graph showing turn detection and the bottom graph showing step length estimation, according to an embodiment.

In the final test, Scenario 5, the surveyor did not follow the reference trajectory correctly and performed an extra turn. The result of this action moved the trajectory to a different area not intended to be covered. Accordingly, FIG. 25 graphically depicts the navigation solution trajectory as determined. Three graphs are depicted in FIG. 26, with the top graph showing the heading values over the course of the trajectory, the middle graph showing the corresponding detection of turns and the bottom graph showing the step length estimation used to determine the segment lengths. A comparison of the navigation solution trajectory, represented as an outline trace, and the reference trajectory, represented as black trace, with the numbered detected turns and the start and end of each trajectory labeled in FIG. 27. In this depiction, the reference trajectory overlays the navigation solution trajectory, obscuring it for portions that overlap. The adjoining table shows the matching of the turns by turn number. Following the techniques of this disclosure, the score in this scenario was estimated as 62.91%.

As an initial operation, map information for the area to be surveyed is obtained. On-line indoor/outdoor map service providers may provide web Application Programming Interfaces (APIs) to access their map database. Accordingly, the corresponding APIs from the map provider may be used to obtain map information for an area encompassing the surveyor's current location. Particularly notable examples of venues that may have corresponding map information include indoor environments such as office buildings, hospitals, malls, conference centers exhibitions, retail stores and the like. This map information may be processed to facilitate its use in providing the survey route. For example, the information may be decoded to extract the necessary map data used for techniques of this disclosure using the APIs and converted into a unified format such as the Geographic Javascript Objective Notation (GeoJson) format, although xml files, binary files and others may be used. The converted map data can then be saved in the local storage for the future use. The decoding and conversion may be performed by external resources and delivered in any suitable manner for use during the generation of the improved tour of the survey route.

In some embodiments, the map information may originally be in geometrical form rather than being directly represented by a grid of nodes and links. Geometrical map information may be segregated into traversable and non-traversable regions. For example, corridors represent an important class of traversable regions in typical indoor environments. As such, a traversable region clipping function may be performed to extract traversable region shape information from background entities if the traversable region information is not available to present the map information as a polygon based geometric map. Many conventional map service providers do not offer traversable region shape information which is important in an indoor map aided algorithm. Therefore, a suitable technique for obtaining the shape of traversable regions that may be present in the venue may include extracting all the other entities from the background entity. The background entity may be a boundary contour that establishes a given building or level of a building or other venue. Foreground entities include all objects such as shops, elevators, escalators, and other obstacles within the boundary contour. The clipping process as used herein refers to the process of cutting away from a set of 2-dimensional geometric shapes those parts that are outside a particular 'clipping' window. This can be achieved by intersecting a subject polygon (background entity) with a clipping polygon (other foreground entities on top of the background entities). The polygons may be defined by a sequence of vertices and any curves may be represented as an appropriate set of line segments.

Figure 27:
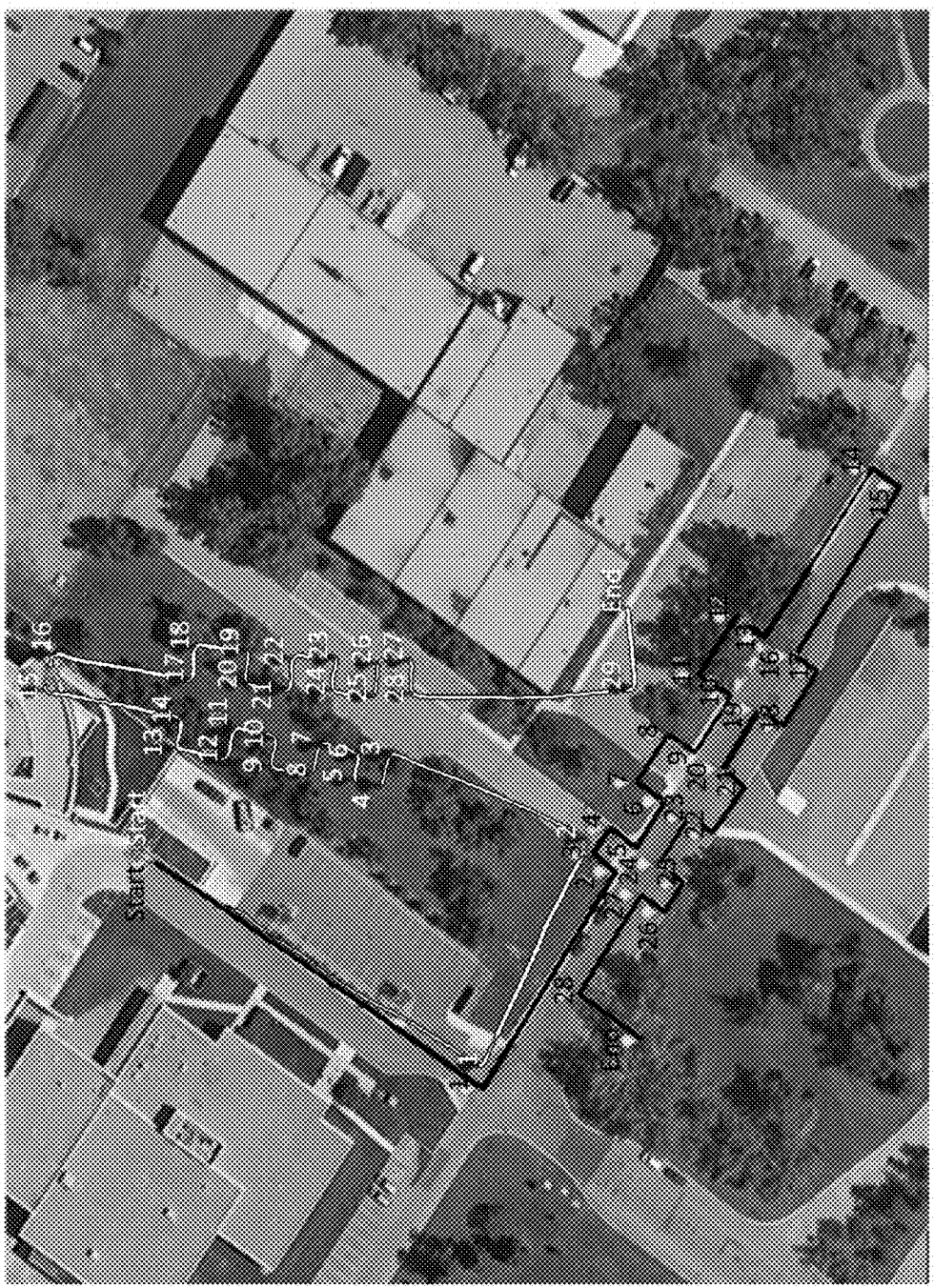
FIG. 27 is a schematic representation comparing the navigation solution and reference trajectories for Scenario 5 according to an embodiment.
Figure 28:
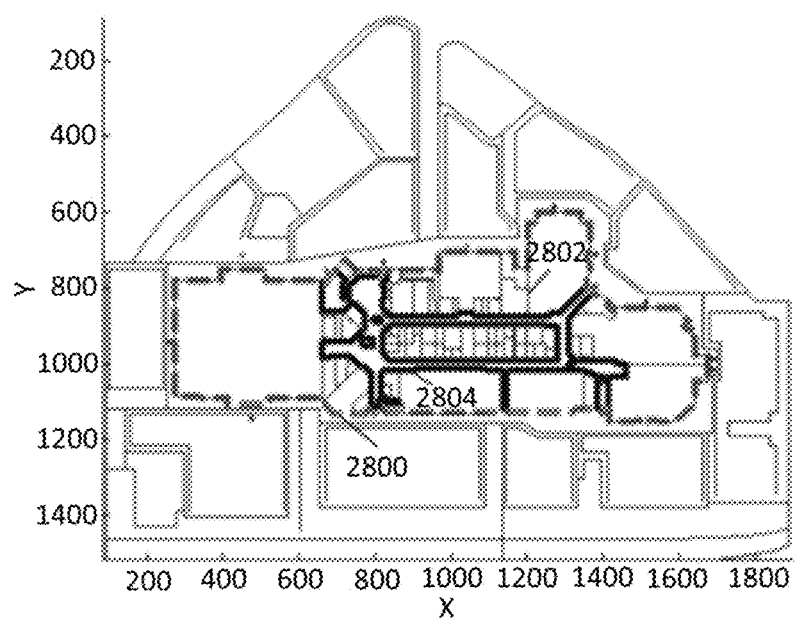
FIG. 28 is a schematic representation of map entity clipping of geometrical map information according to an embodiment.

After iteratively clipping all the other entities from the background, the traversable polygon may be obtained. A suitable clipping algorithms may be configured to accommodate relatively complex polygons with holes, for example, the Vatti clipping algorithm. As will be appreciated, the Vatti clipping algorithm is a general clipping technique that can be used in 2D space to clip concave and convex polygons with and without holes. Various polygon operations can be performed using Vatti's technique such as intersection, union, difference and XOR. An illustration of the results of a clipping algorithm are shown in FIG. 27 for a representative polygon based geometric indoor map. The background entity 2700 for a portion of the map is represented by a dashed line. Foreground entities represented as polygons with fine lines, such as polygon 2702 (the other are not labeled to preserve clarity), are clipped on top of background entity 2700. The resulting polygon 2704, represented by the heavy line, gives the shape of the traversable region. The resulting region shape may be represented by a complex polygon. A complex polygon used herein is a polygon (without self-intersection) which has one or multiple holes inside.

In addition, one or more shapes of the map entities may be decomposed into small simpler polygons to improve the computation efficiency. For example, a vector map following the clipping operations discussed above may be decomposed, typically using quadrilaterals, but triangles may also be appropriate depending on the circumstances. Thus, a trapezoid decomposition may be used to depose relatively complex polygons into more simple trapezoids, while a convex decomposition may be used to partition relatively complex polygons into more simple convex polygons. An optimal decomposition algorithm may be applied to generate a reduced number of polygons after the decomposition process. Any one or combination of decomposition methods may be employed.

Figure 29:
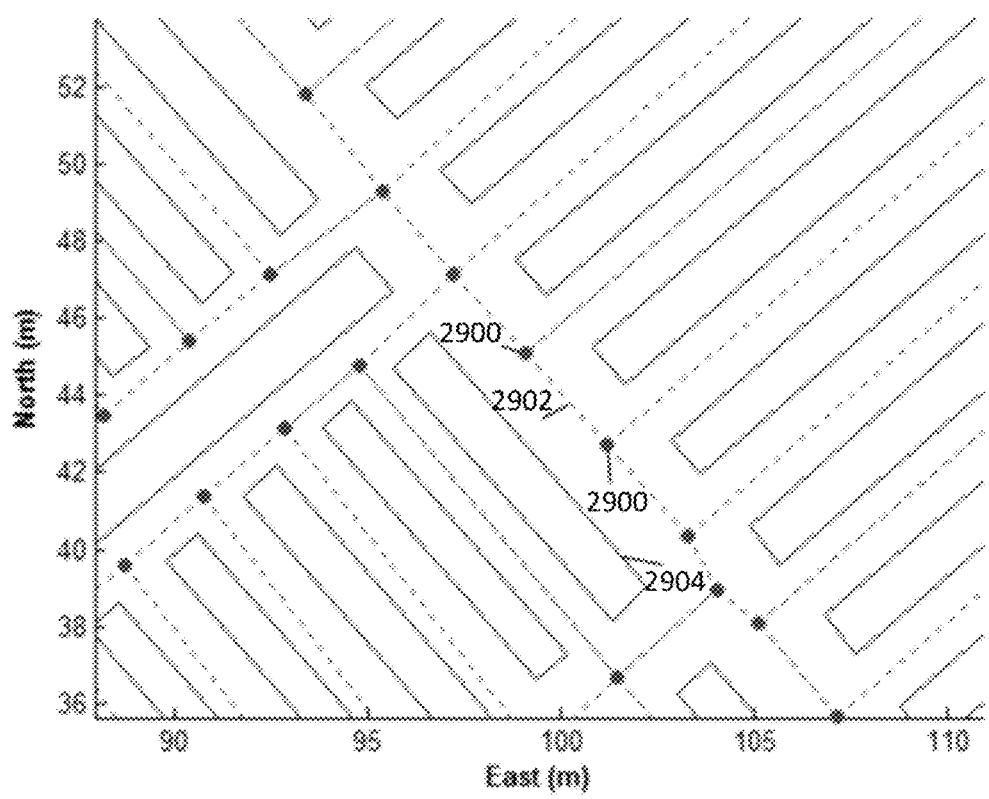
FIG. 29 is a schematic representation of grid map according to an embodiment.

As noted, the map information may represent the traversable regions of the area with connected links and nodes. As used here, a map constructed from the connected links and nodes may be termed a grid map. Any suitable technique may be used to generate the grid map, such as for example by using a voronoi diagram with possibly some other processing. Another example to generate a grid map is by using the geometry of the traversable and non-traversable areas from the map directly together with possibly some of the map entity types. An example grid map is illustrated in FIG. 29. As shown, dots may be used to represent the map nodes, such as dots 2900. The dashed lines represent the connected links, such as link 2902 between dots 2900, and the map entities are represented by the solid polygons, such as 2904. For geometrical map information in the form of polygons, nodes may be inserted as appropriate within the polygons using any suitable technique, such as the calculated slopes of the polygons. As will be appreciated, the number of nodes to be inserted within each polygon may be tailored to achieve the desired resolution of the fingerprint map that will be produced by the survey. Links may then be established between each of the inserted nodes, such as by requiring the links to have a length greater than a predefined threshold. Once the grid map is obtained, an additional optional operation may be performed to identify dummy nodes.

Figure 30:
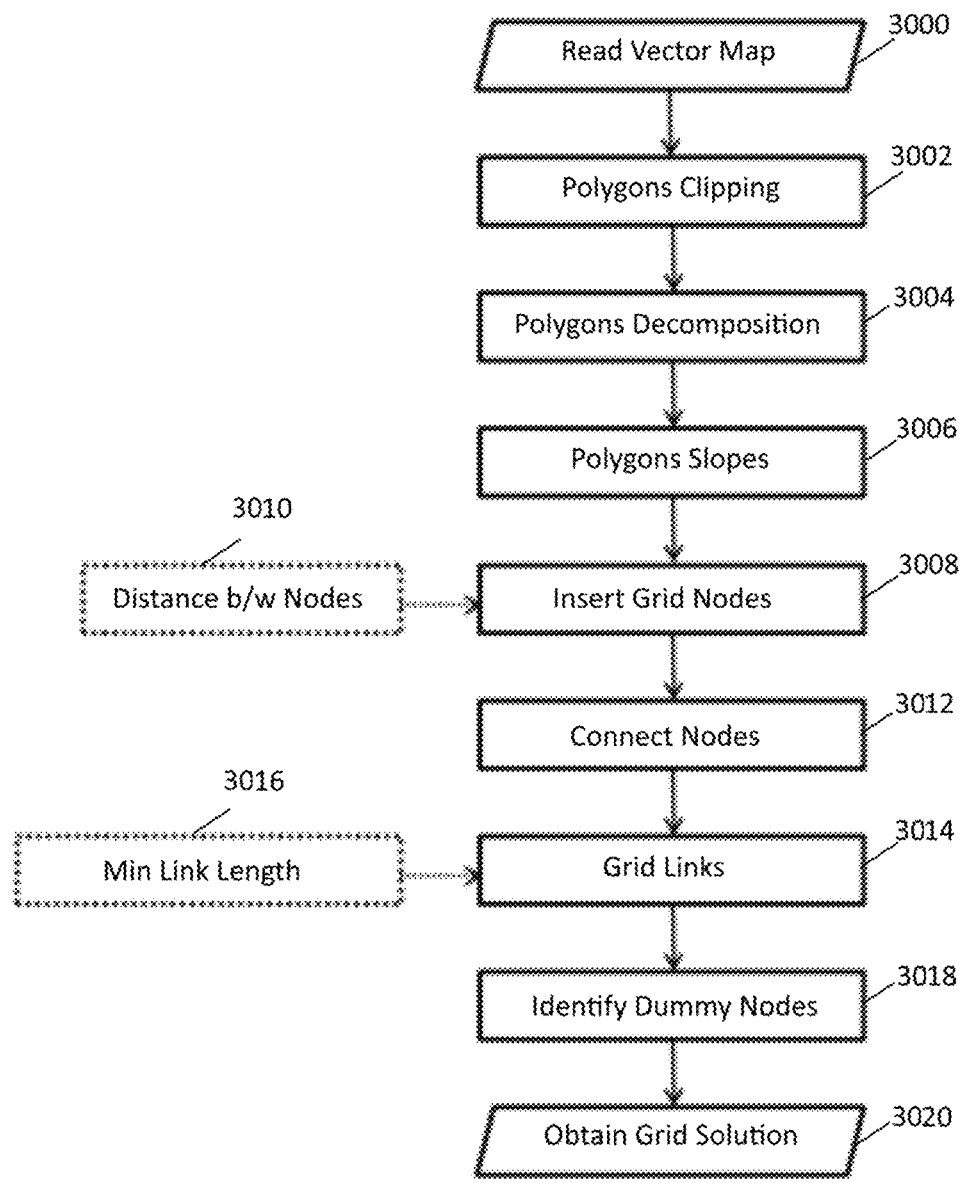
FIG. 30 is a flowchart of a routine for generating a grid map according to an embodiment.
Figure 31:
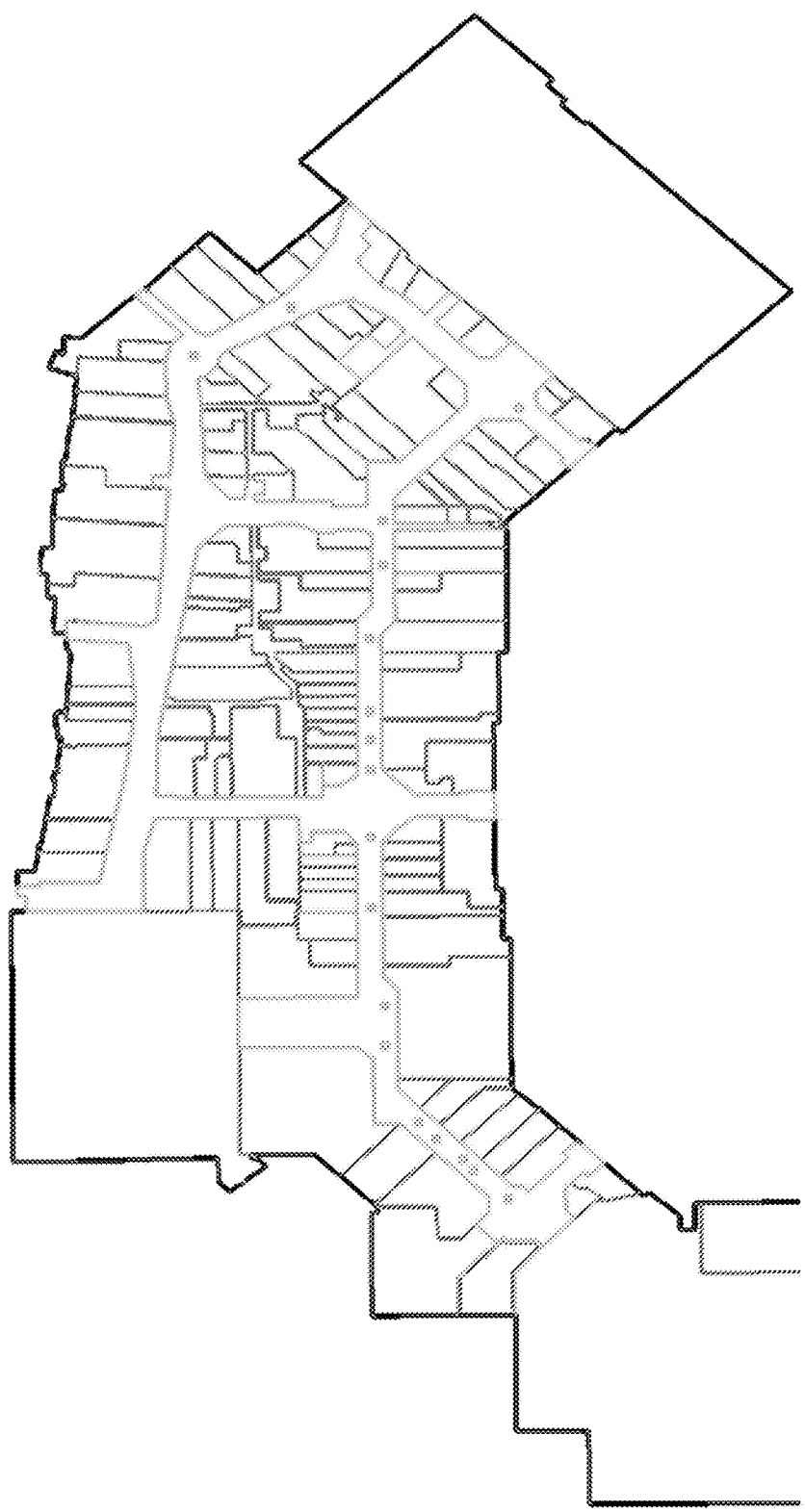
FIG. 31 is a schematic representation of map entity clipping to define traversable regions of an area according to an embodiment.

An exemplary routine for representing map information as a grid of nodes and links is depicted in FIG. 30. Beginning with 3000, geometrical map information, such as a vector map, is received as input. Vector map information may be listed in two ways. In the first case, a polygon establishing the border of the area may be the initial listing, followed by polygons corresponding to non-traversable regions. In the second case, polygons corresponding to traversable regions are listed in the vector representation. For the first case, in 3002, the area of each obstacle within the border may be clipped as discussed above. A difference operation may be employed to calculate the difference between the border and obstacles polygons, with another exemplary illustration depicted in FIG. 31, in which the heavy line represents the border of the area, dashed lines represent the obstacles polygons and grey lines represent the traversable region of the area. In the second case, if the vector representation of the map lists the traversable areas polygons, then union operation may be employed to obtain the traversable area map instead of the clipping operation mentioned for first case in element 3002 of FIG. 30.

Figure 32:
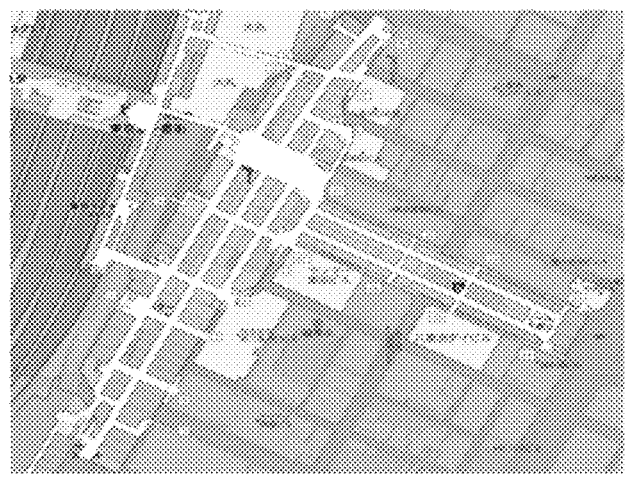
FIG. 32 is a schematic representation of geometrical map information for a first area to be surveyed according to an embodiment.
Figure 33:
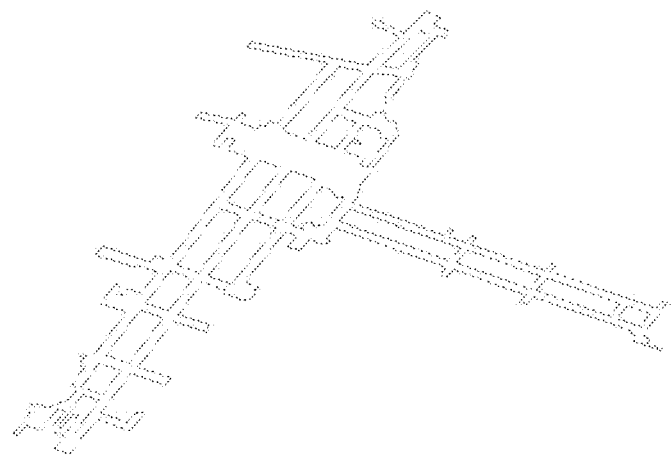
FIG. 33 is a schematic representation of map entity clipping to define traversable regions for the first area shown in FIG. 32.
Figure 34:
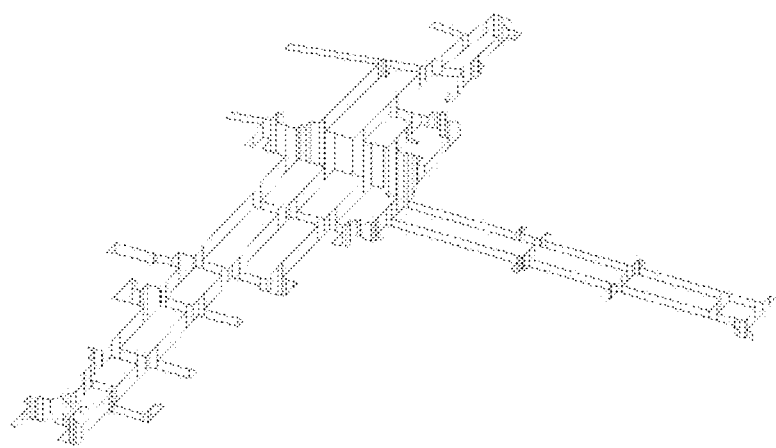
FIG. 34 is a schematic representation of polygon decomposition of the traversable regions for the first area shown in FIG. 33.
Figure 35:
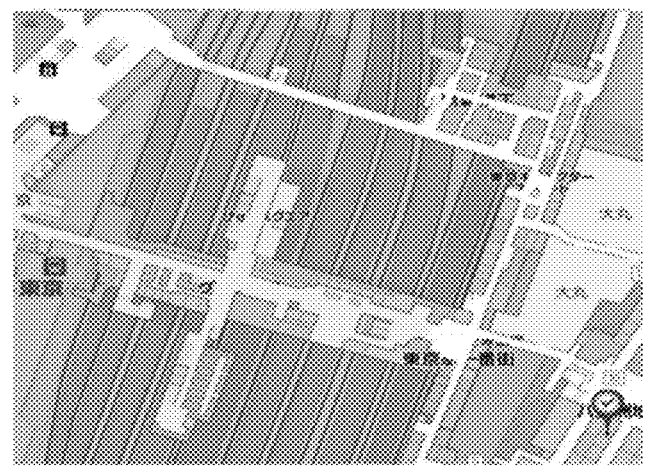
FIG. 35 is a schematic representation of geometrical map information for a second area to be surveyed according to an embodiment.
Figure 36:
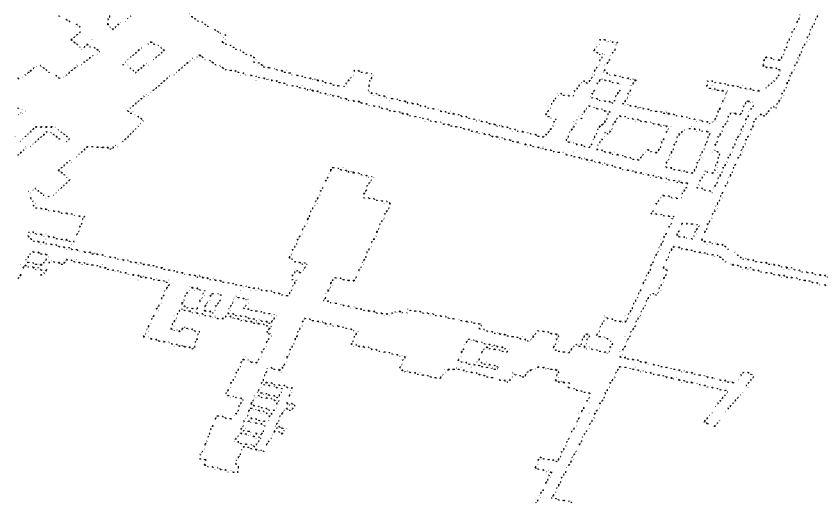
FIG. 36 is a schematic representation of map entity clipping to define traversable regions for the second area shown in FIG. 34 according to an embodiment.
Figure 37:
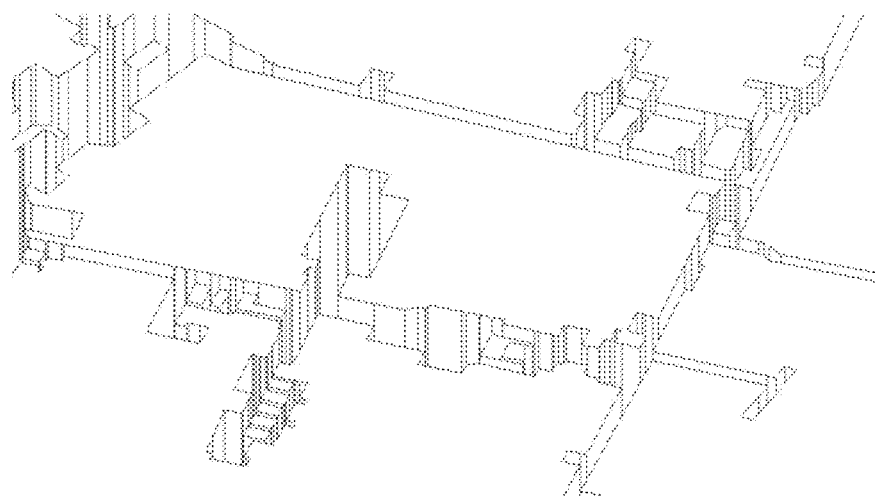
FIG. 37 is a schematic representation of polygon decomposition of the traversable regions for the second area shown in FIG. 36 according to an embodiment.

Referring back to FIG. 30, decomposition of the area into polygons is performed in 3004 using triangles and quadrilaterals as warranted. Subsequent generation of the grid may be facilitated by using a familiar polygon decomposition method such as the trapezoidal decomposition described above. For example, the decomposition may be based on vertical lines extending from each corner in the clipped map. As a result, each polygon generated in the decomposition has at least one side formed by vertical lines that are not part from the area or the sides of the original border polygon, typically forming a quadrilateral. Examples of representative polygon decompositions are depicted in FIGS. 32-37. Specifically, FIG. 32 schematically depicts geometrical map information for a first area to be surveyed, with FIG. 33 showing the results of clipping of this area to define traversable regions and FIG. 34 showing the decomposition of the traversable regions into the simplified polygons using vertical lines to define the sides of the polygons. Similarly, FIG. 35 schematically depicts geometrical map information for a second area to be surveyed, with FIG. 36 showing the results of clipping of this area to define traversable regions and FIG. 37 showing the decomposition of the traversable regions into the simplified polygons using vertical lines to define the sides of the polygons.

Figure 38:
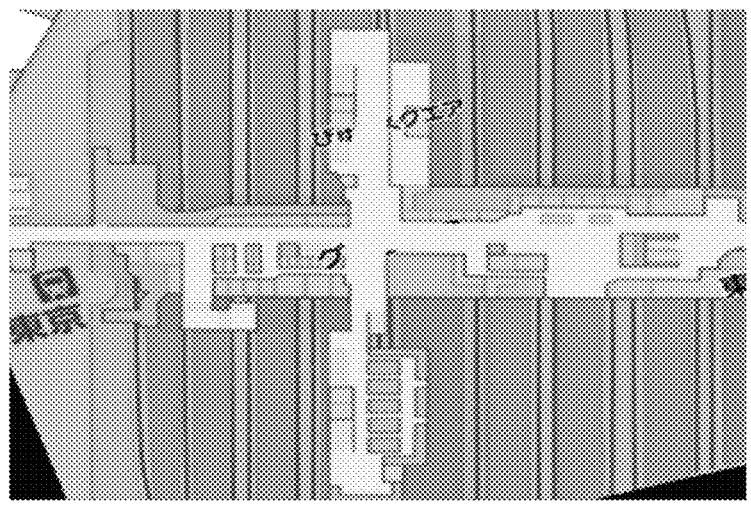
FIG. 38 is a schematic representation of geometrical map information of an area to be surveyed according to an embodiment.
Figure 39:
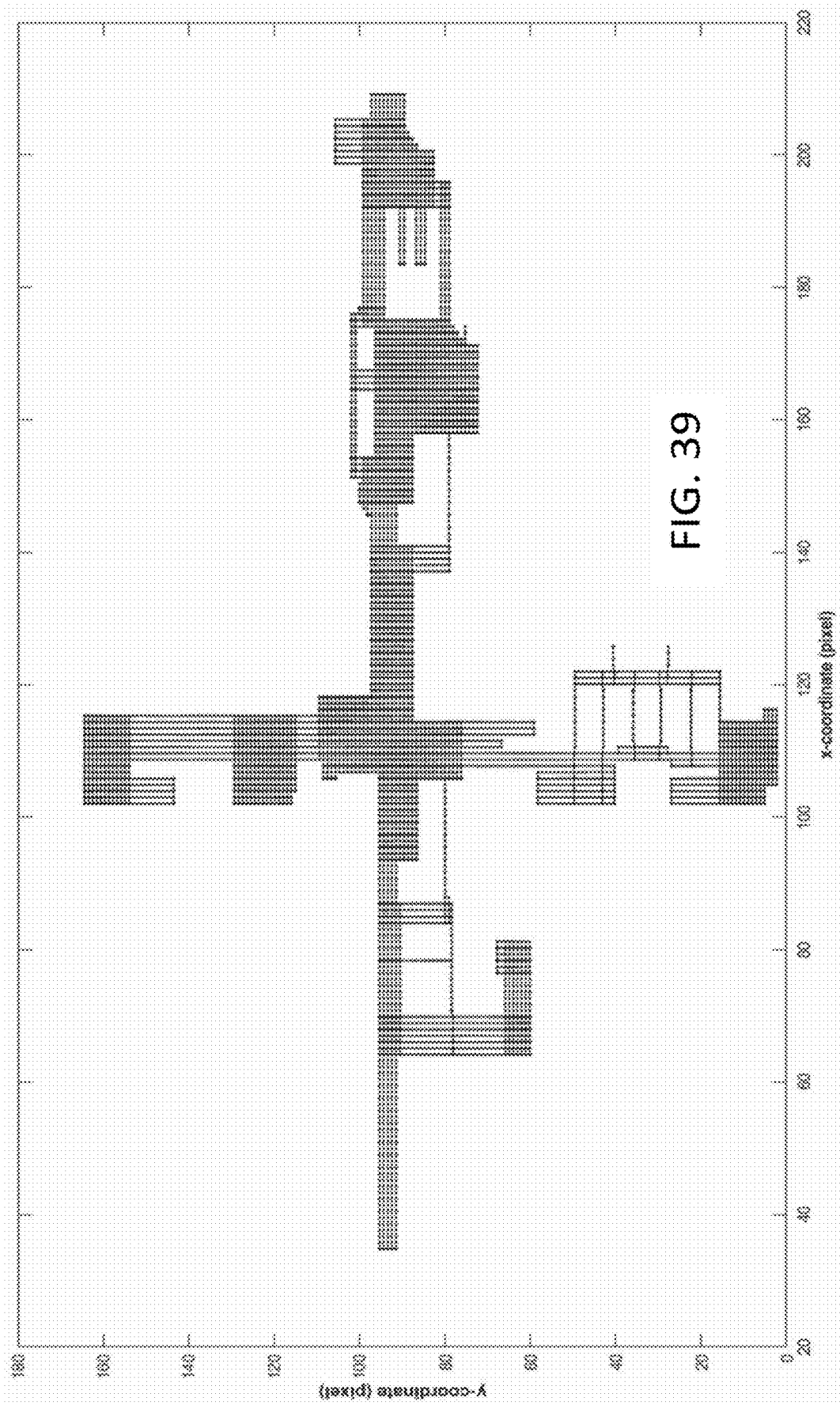
FIG. 39 is a schematic representation of the area shown in FIG. 38 following clipping, decomposition, node insertion according to an embodiment.
Figure 40:
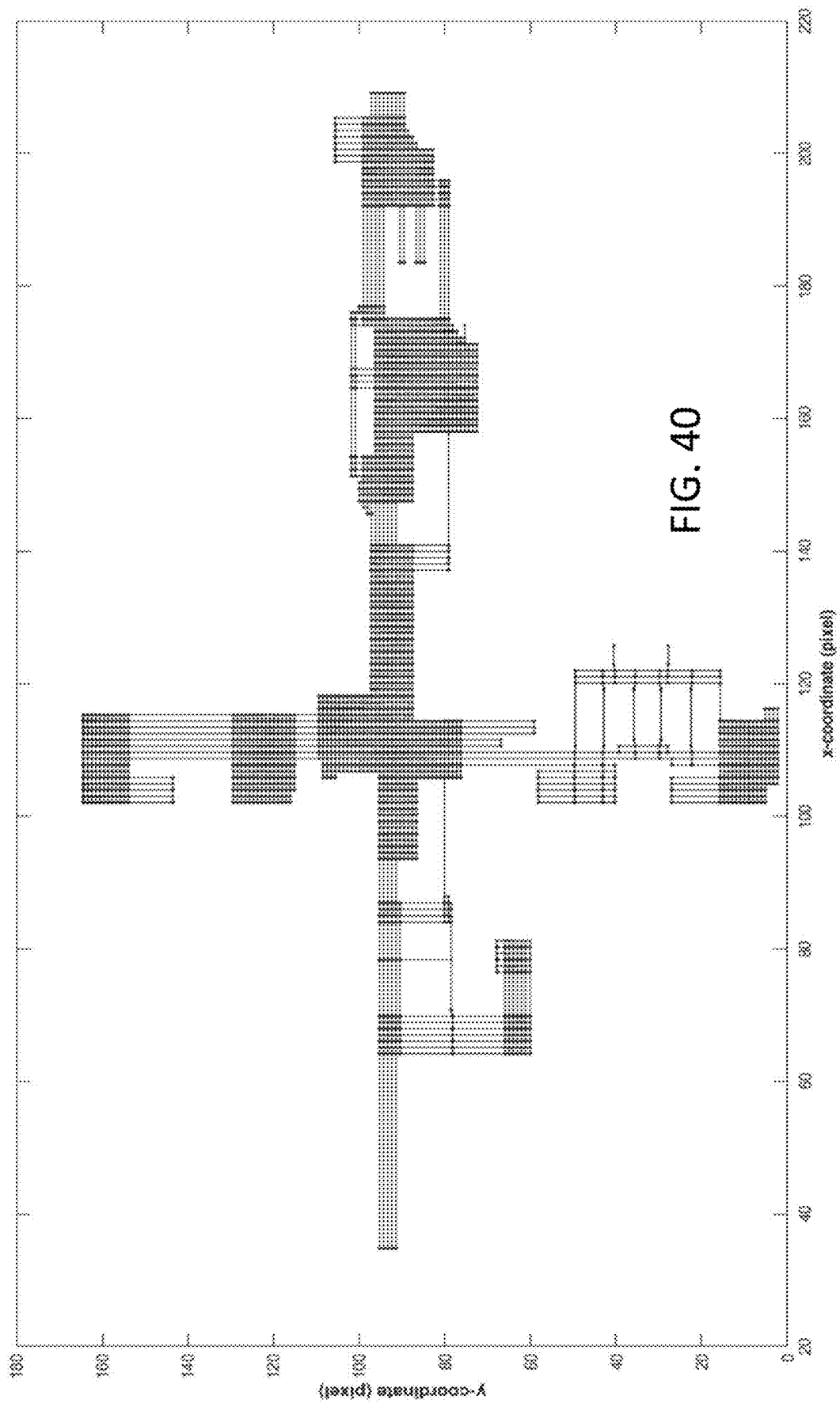
FIG. 40 is a schematic representation of the area shown in FIG. 39 following removal of dummy nodes according to an embodiment.

Again returning to FIG. 30, the slope of each polygon in the decomposed map may be calculated in 3006. Proper calculation of the slopes aligns the grid links that will be generated in a parallel relationship with the border of the area. For each polygon, the sides which are originally part of the original area may be used to calculate the possible slopes values of the decomposed polygon. If any polygon has two or more possible slopes, the slopes of the surrounding polygons may be used to select the correct slope of the polygon. In 3008, nodes may be inserted within each of the polygons based on the polygon slopes to form the grid. As indicated by 3010, an optional parameter may be used to define the distance between nodes to provide a grid having a desired resolution. Additionally, nodes may be spaced an appropriate distance from the sides of the area to be surveyed. Next, in 3012, each inserted node within the polygons is connected to neighbors to generate a network of all possible grids for the area to be surveyed. This network may be used to provide the final grid solution. Connection of the nodes may be based on the distance between them, with nodes inside each decomposed polygon being connected first followed by connecting the nodes on the edges of the decomposed neighbor polygons. In 3014, grid links are established between the nodes. As indicated by 3016, an optional parameter is the minimum link length, which may be set to a desired value depending on the application so that only links meeting the minimum grid-length requirement will be a part of the final grid solution. Alternatively or in addition, grid links on the edge of the area to be surveyed may also be included. Next, dummy nodes may be identified in 2918. A dummy node may be defined as a node that is connected to only two other nodes with straight links and is not a part from any intersection. Furthermore, the starting or ending node should not be considered a dummy node. Dummy nodes can be detected by evaluating the number of nodes to which it is connected the slopes of the connecting links. In some embodiments, identified dummy nodes may then be removed from the grid. Alternatively, identified dummy nodes may accommodated by adapting the tour generation techniques. The output 3020 of the routine as indicated is the grid solution. To help illustrate these operations, FIG. 38 depicts the geometrical map information of an area to be surveyed, which following the operations described above regarding clipping, decomposition, node insertions and establishment of grid may result in the grid shown in FIG. 39 before removal of the dummy nodes. Correspondingly, FIG. 40 schematically depicts a final grid solution with the identified dummy nodes removed.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a position that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a position that is further programmed to run, in the background, a routine to simulate artificial outages in the absolute navigation information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigation information (e.g. GNSS); the forward integrated position in the device integrating the available sensors with the absolute navigation information (e.g. GNSS) and possibly with the optional speed or velocity readings; or a backward smoothed integrated position integrating the available sensors with the absolute navigation information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time position in its future run (i.e. real-time run after the background routine has finished running), for example, by having improved values for the parameters of the forward state estimation technique used for navigation in the present module.

It is further contemplated that the techniques of this disclosure can also be used with a position that is further integrated with maps (such as street maps, indoor maps or models, or any other environment map or model in cases of applications that have such maps or models available), and a map aided or model aided routine. Map aided or model aided can further enhance the position during the absolute navigation information (such as GNSS) degradation or interruption. In the case of model aided, a sensor or a group of sensors that acquire information about the environment can be used such as, for example, Laser range finders, cameras and vision systems, or sonar systems. These new systems can be used either as an extra help to enhance the accuracy of the position during the absolute navigation information problems (degradation or absence), or they can totally replace the absolute navigation information in some applications.

It is further contemplated that the techniques of this disclosure can also be used with a position that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a position that relies on an ultra-tight integration scheme between GNSS receiver and the other sensors' readings.

It is further contemplated that the techniques of this disclosure can also be used with a position that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a position that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or position (for example having GNSS with good availability and accuracy) can help the devices with degraded or unavailable GNSS to get an improved positioning or position. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good position utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for providing an improved survey process through automatically providing an improved survey route, wherein the survey is for building fingerprint maps for an area and comprises traversing at least one provided improved survey route with at least one device, wherein each device comprises recording signal measurements at a plurality of positions along the at least one provided survey route, and wherein the survey comprises constructing a fingerprint map of the area based at least in part on the positions and the recorded signal measurements, the method comprising:
   a) obtaining digitized map information for an area, wherein the map information comprises a grid of nodes and links and wherein the area comprises an indoor venue;
   b) transforming the grid to a directed graph comprising vertices and edges, wherein the directed graph is a data structure;
   c) generating an improved tour that entirely traverses the directed graph by traversing each edge, wherein the improvement to the tour further comprises at least one of optimality and usability;
   d) wherein generating the improved tour further comprises identifying an edge as a bridge if traversing that edge breaks the directed graph into two unconnected graphs so that the improved tour does not traverse the identified edge;
   e) generating at least one improved survey route based at least in part on the improved tour; and
   f) improving a survey process for building fingerprint maps for the area by conducting the survey using the at least one improved survey route.

2. The method of claim 1, wherein transforming the grid to the directed graph comprises providing a path from every vertex to any other vertex.

3. The method of claim 2, wherein transforming the grid to the directed graph comprises representing each link of the grid with one inward edge and one outward edge.

4. The method of claim 1, wherein generating the tour comprises deactivating each edge after the generated tour traverses it.

5. The method of claim 4, wherein generating the tour further comprises sequentially adding edges to the tour that are one of;
   (i) edges that are not identified as bridges; and
   (ii) edges that are identified as the only active edge of a vertex.

6. The method of claim 5, wherein generating the tour further comprises selecting an edge to be sequentially added to the tour from among a straight edge and a turn edge for a given vertex based at least in part on a distance to a previous turn.

7. The method of claim 6, wherein the straight edge is selected when the distance to the previous turn is below a threshold.

8. The method of claim 6, wherein the turn edge is selected when the distance to the previous turn is above a threshold.

9. The method of claim 6, further comprising randomly selecting among the straight edge and the turn edge when the distance to the previous turn is between two thresholds.

10. The method of claim 1, wherein generating the tour entirely traverses the directed graph by traversing each edge only once.

11. The method of claim 1, wherein providing the at least one survey route based at least in part on the tour comprises providing a plurality of routes wherein each route has a route length within a predetermined range.

12. The method of claim 1, further comprising traversing the provided survey route with the at least one device, wherein each device comprises an integrated sensor assembly configured to output data representing motion of the device.

13. The method of claim 12, further comprising recording signal measurements with each device at the plurality of positions along the provided survey route, the plurality of positions determined based at least in part on the motion data, wherein the signal measurements are at least one of wireless networking signals, radio frequency signals and magnetic field signals.

14. The method of claim 13, further comprising constructing a fingerprint map of the area based at least in part on the determined positions and the recorded signal measurements.

15. The method of claim 12, wherein the device is one of:
   i) configured to be conveyed automatically; and
   ii) configured to be conveyed by a human.

16. The method of claim 12, further comprising assessing traversal of the provided survey route by comparing characterizations of the traversed route to a reference, wherein the traversed route characterizations are based at least in part on the motion data and the reference is based at least in part on the provided survey route and wherein the assessment is at least one of: i) an in-route assessment; and ii) a post-route assessment.

17. The method of claim 16, further comprising scheduling another traversal of the provided survey route based on the assessment.

18. The method of claim 16, further comprising scheduling a traversal of a next survey route, wherein the next survey route is selected from a pool of survey routes based at least in part on current proximity.

19. The method of claim 18, wherein the pool of survey routes comprises the provided survey route if a traversal of the provided survey route fails the assessment.

20. The method of claim 16, wherein the assessment is an in-route assessment and wherein the traversed route characterizations comprise a distance traveled since a previous benchmark point, a difference between corresponding turn angles, and a difference between corresponding segment lengths.

21. The method of claim 20, further comprising directing a discontinuation of a traversal of the provided survey route before completion based at least in part on the assessment.

22. The method of claim 21, further comprising scheduling traversal of a next survey route in sequence after the discontinuation, wherein the next survey route is selected from the provided survey route and another survey route based on proximity to a start of the next survey route when the discontinuation occurs.

23. The method of claim 16, wherein the assessment is an in-route assessment, further comprising providing feedback during traversal of the provided survey route based at least in part on the assessment.

24. The method of claim 16, wherein the assessment is a post-route assessment and wherein the post-route assessment comprises a scoring routine performed after traversal of the provided survey route is complete.

25. The method of claim 24, wherein the traversed route characterizations are turn-based and segment-based.

26. The method of claim 25, wherein the segment-based traversed route characterizations comprise any one or any combination of: i) a difference between reference segment length and corresponding trajectory segment length; and ii) a determined straightness factor for at least one segment.

27. The method of claim 25, wherein the turn-based traversed route characterizations comprise any one or any combination of: i) a difference between reference turn angles and corresponding trajectory turn angles; ii) identification of missed turns; and iii) identification of extra turns.

28. The method of claim 24, further comprising scheduling a traversal of a next survey route based on the assessment, wherein the next survey route is selected from a pool of survey routes that comprises the provided survey route if a traversal of the provided survey route fails the assessment.

29. The method of claim 1, wherein the directed graph corresponds to the area as a whole.

30. The method of claim 1, further comprising clustering the grid into a plurality of zones, wherein each zone corresponds to one directed graph.

31. The method of claim 30, wherein clustering the grid comprises a k-means technique.

32. The method of claim 31, wherein the k-means technique comprises an objective function.

33. The method of claim 32, wherein the k-means technique comprises:
  a) initializing centroids;
  b) assigning vertices of the directed graph to each centroid;
  c) updating positions of the centroids based at least in part on the assigned vertices; and
  d) repeating b) and c) until positions of the centroids converge.

34. The method of claim 1, further comprising decomposing the directed graph to reduce a number of turns in the generated tour.

35. The method of claim 34, wherein decomposing the directed graph comprises:
  a) identifying boundary vertices and boundary nodes;
  b) generating boundary to boundary paths;
  c) segregating boundary to boundary paths into a first pool and a second pool based at least in part on an intersection count of each boundary to boundary path; and
  d) constructing two directed graphs corresponding to the first pool and the second pool of boundary to boundary paths.

36. The method of claim 1, wherein the obtained map information is a geometrical map, and wherein the method further comprises processing the geometrical map to generate the grid of nodes and links.

37. The method of claim 36, further comprising processing the geometrical map by clipping obstacles to define a traversable area.

38. The method of claim 37, further comprising processing the geometrical map by decomposing the traversable area into polygons and inserting nodes within the polygons based at least in part on calculated slopes of the polygons, wherein the inserted nodes are the nodes of the grid.

39. The method of claim 38, wherein the node insertion is controlled to provide a desired resolution for the survey.

40. The method of claim 38, further comprising processing the inserted nodes to establish links of the grid, wherein each link has a length greater than a threshold.

41. The method of claim 36, further comprising processing the grid to identify dummy nodes.

42. A system for providing an improved survey process through automatically providing an improved survey route, wherein the survey is for building fingerprint maps for an area and comprises traversing at least one provided improved survey route with at least one device, wherein each device comprises recording signal measurements at a plurality of positions along the at least one provided survey route, and wherein the survey comprises constructing a fingerprint map of the area based at least in part on the positions and the recorded signal measurements, the system comprising:
  remote processing resources having at least one processor that is operative to:
    a) obtain digitized map information for an area, wherein the map information comprises a grid of nodes and links and wherein the area comprises an indoor venue;
    b) transform the grid to a directed graph comprising vertices and edges, wherein the directed graph is a data structure;
    c) generate an improved tour that entirely traverses the directed graph by traversing each edge, wherein the improvement to the tour further comprises at least one of optimality and usability;
    d) wherein the at least one processor is operative to generate the improved tour by identifying an edge as a bridge if traversing that edge breaks the directed graph into two unconnected graphs so that the improved tour does not traverse the identified edge;
e) generate at least one improved survey route based at least in part on the improved tour; and
f) improve the survey process for building fingerprint maps for the area by providing the at least one improved survey route that improves the survey process; and at least one device, wherein the at least one device comprises an integrated sensor assembly configured to output data representing motion of the at least one device when traversing the provided improved survey route to conduct the improved survey.

43. The system of claim 42, wherein at least one processor is operative to:
i) receive signal measurements recorded by the at least one device at the plurality of positions along the provided survey route, wherein each device comprises an integrated sensor assembly configured to output data representing motion of the portable device and the plurality of positions are determined based at least in part on the motion data and wherein the signal measurements are at least one of wireless networking signals, radio frequency signals and magnetic field signals; and
ii) construct a fingerprint map of the venue based at least in part on the determined positions and the recorded signal measurements.

44. The system of claim 42, wherein the obtained map information is a geometrical map and wherein at least one processor is operative to process the geometrical map to generate the grid of nodes and links.

45. The system of claim 42, wherein at least one processor is operative to assess traversal of the provided survey route by at least one device at a plurality of positions, wherein each device comprises an integrated sensor assembly configured to output data representing motion of the portable device, wherein the assessment compares characterizations of the traversed route to a reference, wherein the traversed route characterizations are based at least in part on the motion data and the reference is based at least in part on the provided survey route and wherein the assessment is at least one of: i) an in-route assessment; and ii) a post-route assessment.

46. The system of claim 45, wherein at least one processor is operative to schedule another traversal of the provided survey route based on the assessment.

47. The system of claim 45, wherein at least one processor is operative to schedule traversal of a next survey route, wherein the next survey route is selected from a pool of survey routes based at least in part on current proximity, wherein the pool of survey routes comprises the provided survey route if traversing the provided survey route fails the assessment.

48. The system of claim 45, further comprising one of:
i) wherein at least one processor is operative to perform a post-route assessment, wherein the post-route assessment comprises a scoring routine performed after traversal of the provided survey route is complete; and
ii) wherein at least one processor is operative to perform an in-route assessment and providing feedback during traversal of the provided survey route based at least in part on the assessment.

49. The system of claim 42, wherein each device further comprises at least one processor operative to assess traversal of the provided survey route by that device at a plurality of positions, wherein the assessment compares characterizations of the traversed route to a reference, wherein the traversed route characterizations are based at least in part on the motion data and the reference is based at least in part on the provided survey route and wherein the assessment is at least one of: i) an in-route assessment; and ii) a post-route assessment.

50. The system of claim 49, wherein the assessment is an in-route assessment and wherein the traversed route characterizations comprise a distance traveled since a previous benchmark point, a difference between corresponding turn angles, and a difference between corresponding segment lengths.

51. The system of claim 50, wherein at least one processor of each device is operative to provide feedback during traversal of the provided survey route based at least in part on the assessment.

52. The system of claim 51, wherein the device is configured as at least one of:
i) a device that is conveyed by a human user;
ii) a device that is conveyed by a platform propelled by a human user;
iii) a device that is conveyed by a platform driven by a human user;
iv) a device that is conveyed by an automated platform; and
v) a portable device.

* * * * *